US006916037B2

(12) United States Patent
Baxter et al.

(10) Patent No.: US 6,916,037 B2
(45) Date of Patent: Jul. 12, 2005

(54) VEHICLE SUSPENSION

(75) Inventors: Bob G. Baxter, Warrenton, MO (US); Scott R. Peters, Warrenton, MO (US)

(73) Assignee: The Holland Group, Inc., Holland, MI (US)

( * ) Notice: Subject to any disclaimer, the term of this patent is extended or adjusted under 35 U.S.C. 154(b) by 111 days.

(21) Appl. No.: 10/400,039

(22) Filed: Mar. 26, 2003

(65) Prior Publication Data

US 2003/0209872 A1 Nov. 13, 2003

Related U.S. Application Data

(60) Provisional application No. 60/368,443, filed on Mar. 28, 2002.

(51) Int. Cl.$^7$ ................................................. B60G 5/04
(52) U.S. Cl. .............................. 280/683; 280/124.104; 280/124.128
(58) Field of Search ................................. 280/677, 678, 280/682, 683, 124.104, 124.11, 124.111, 124.112, 124.128, 124.153

(56) References Cited

U.S. PATENT DOCUMENTS

| | | |
|---|---|---|
| 2,970,848 A | 2/1961 | Rice |
| 3,147,024 A | 9/1964 | Brockman |
| 3,520,548 A | 7/1970 | McGee |
| 4,033,606 A | 7/1977 | Ward et al. |
| 4,200,267 A | 4/1980 | King |
| 4,202,564 A | 5/1980 | Strader |
| 4,256,326 A | 3/1981 | Cantrell et al. |
| 4,383,703 A | 5/1983 | Honda et al. |
| 4,530,515 A | 7/1985 | Raidel |
| 4,756,550 A | 7/1988 | Raidel |
| 4,811,972 A | 3/1989 | Wiley, Jr. |

(Continued)

FOREIGN PATENT DOCUMENTS

CA 986549 3/1976

OTHER PUBLICATIONS

Holland Neway/Dana Spicer, Air Ride Axle Series, Integrated Air Suspension Axle Package brochure, Mar. 2000, USA.

Holland Neway/Dana Spicer, Air Ride Axle Series, Integrated Slider Axle Package brochure, Mar. 2000, USA.

Sternberg, E.R., Heavy–Duty Truck Suspensions, SAE Paper 760369, Truck Systems Design Handbook, Feb. 1976, pp. 1–52, PT–41, Society of Automotive Engineers, Inc., USA.

Highway Parallelogram Trailer Air Suspension System brochure, 1997, USA.

*Primary Examiner*—David R. Dunn
(74) *Attorney, Agent, or Firm*—Price, Heneveld, Cooper, DeWitt & Litton, LLP.

(57) ABSTRACT

A vehicle suspension system comprising a frame and a pair of levers carried by the frame. Each lever is pivotally mounted for swinging movement on an axis extending transverse to the frame. A pair of forward-extending beams and rearward-extending beams have pivot connections with a respective lever and support a forward and rearward axle. Two forward springs and two rearward springs are each interposed between the beams and the frame. A pair of torque arms is carried by the frame forward of the forward-extending beams. Each torque arm has a first pivot connection with a respective beam and a second pivot connection with the frame forward of the first pivot connection with the beam. The torque arms function to restrict pivotal movement of the beams about their respective pivot connections with the levers thereby to reduce torsional forces applied to the forward axle.

28 Claims, 28 Drawing Sheets

U.S. PATENT DOCUMENTS

| | | | |
|---|---|---|---|
| 5,013,063 A | 5/1991 | Mitchell James L. | |
| 5,015,004 A | 5/1991 | Mitchell | |
| 5,016,905 A | * 5/1991 | Licari | 280/677 |
| 5,088,758 A | 2/1992 | Wall et al. | |
| 5,127,668 A | 7/1992 | Raidel | |
| 5,354,091 A | 10/1994 | Baxter et al. | |
| 5,366,237 A | 11/1994 | Dilling et al. | |
| 5,375,871 A | 12/1994 | Mitchell et al. | |
| 5,470,096 A | 11/1995 | Baxter | |
| 5,524,921 A | 6/1996 | Ellingsen | |
| 5,667,240 A | 9/1997 | Mitchell | |
| 5,678,845 A | 10/1997 | Stuart | |
| 5,683,098 A | 11/1997 | VanDenberg | |
| 5,718,445 A | 2/1998 | VanDenberg | |
| 5,845,919 A | 12/1998 | VanDenberg | |
| 5,882,031 A | 3/1999 | VanDenberg | |
| 5,908,198 A | 6/1999 | VanDenberg | |
| 5,915,705 A | 6/1999 | VanDenberg | |
| 5,944,339 A | 8/1999 | McKenzie et al. | |
| 5,988,672 A | 11/1999 | VanDenberg | |
| 6,099,016 A | 8/2000 | Peveler | |
| 6,206,407 B1 | 3/2001 | Fuchs et al. | |
| 6,264,231 B1 | 7/2001 | Scully | |
| 6,340,165 B1 | * 1/2002 | Kelderman | 280/124.153 |

* cited by examiner

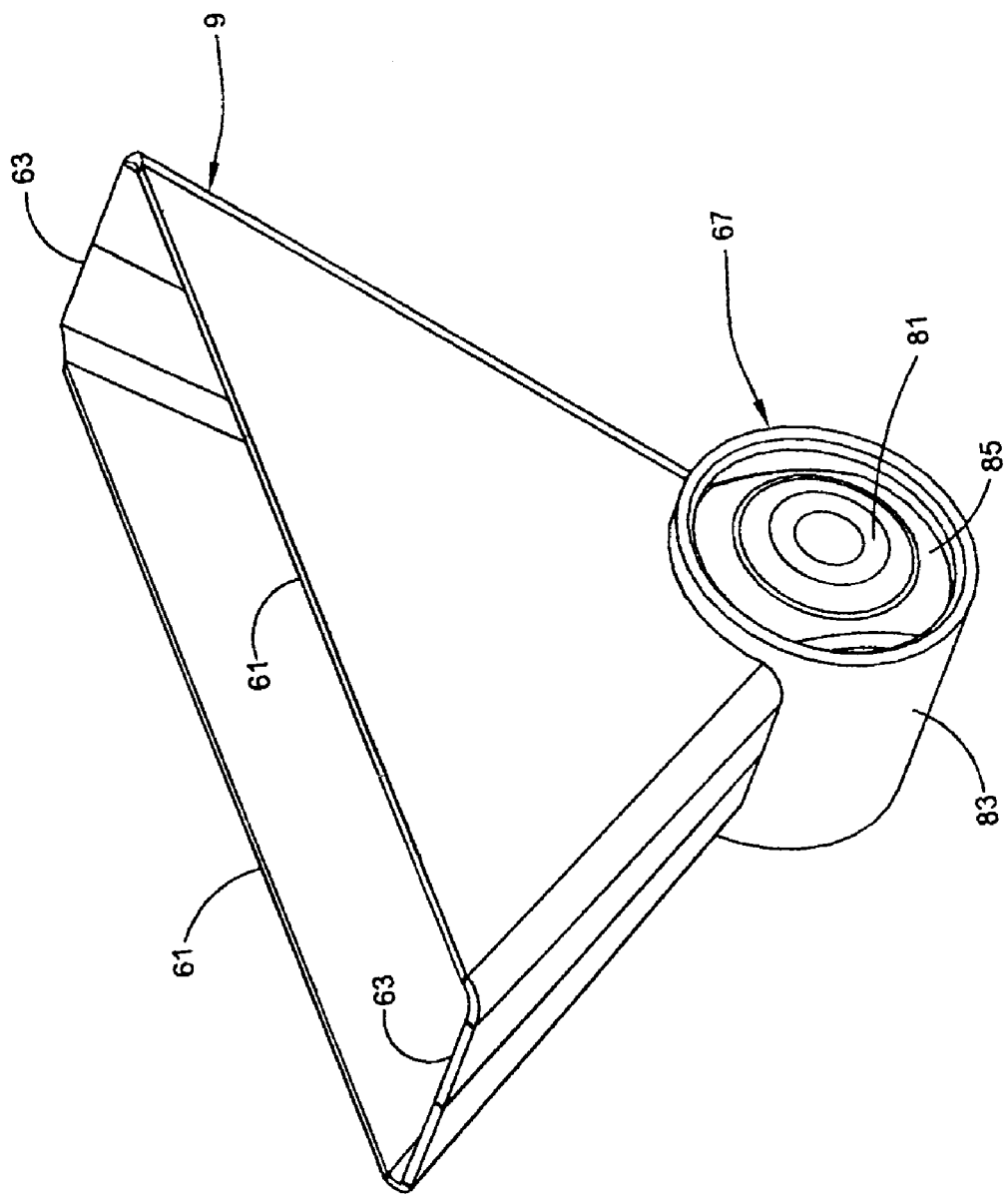

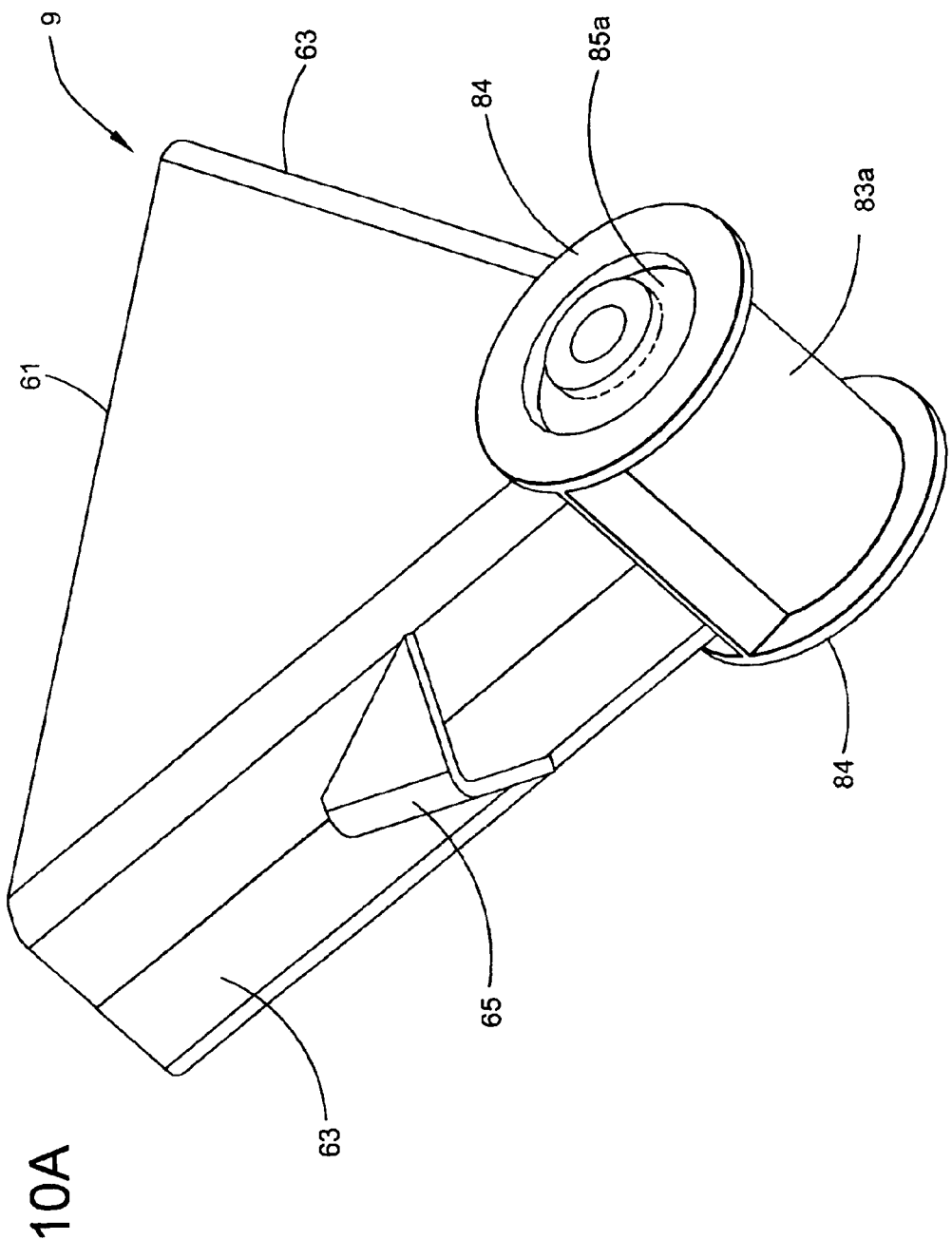

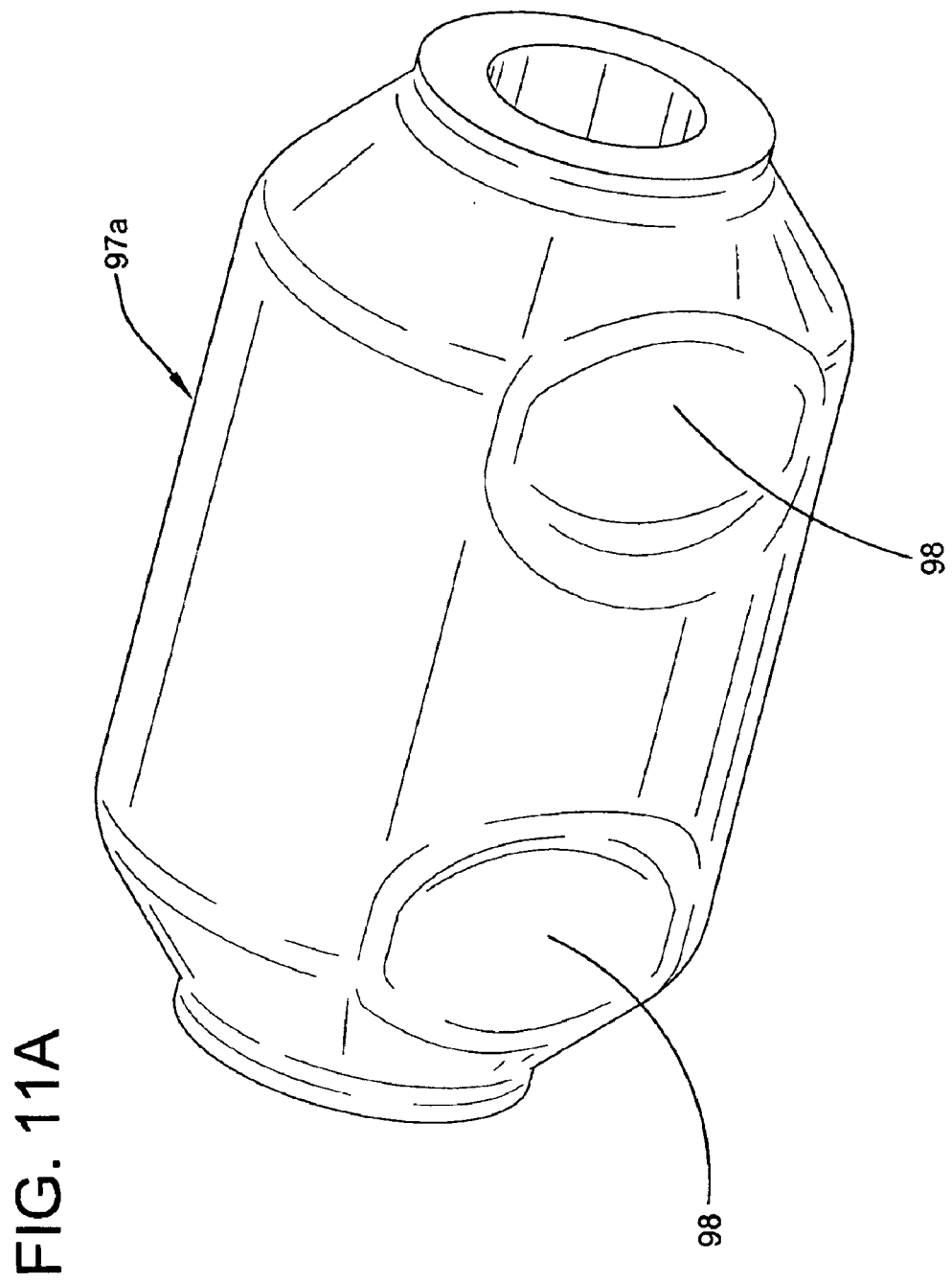

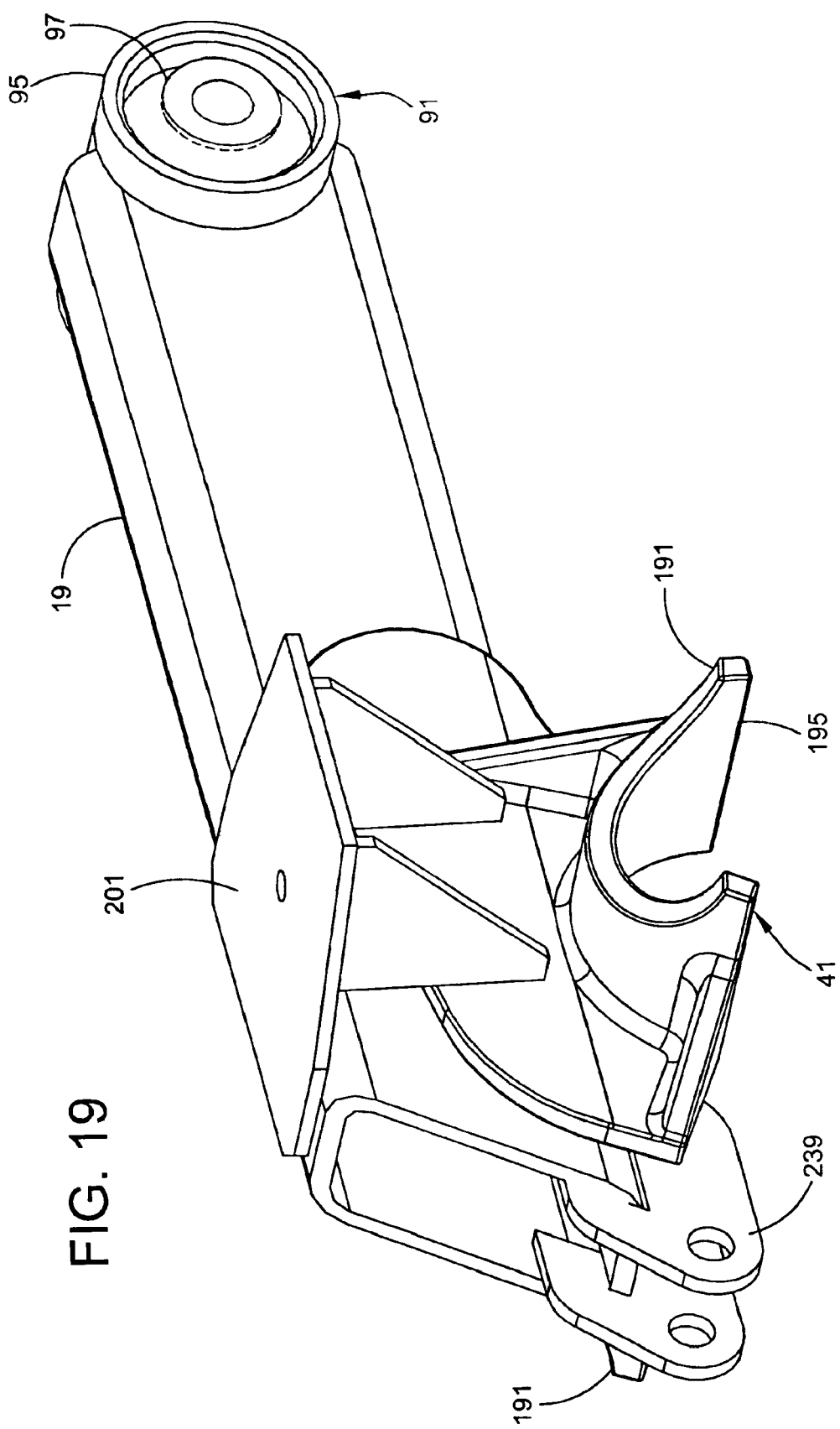

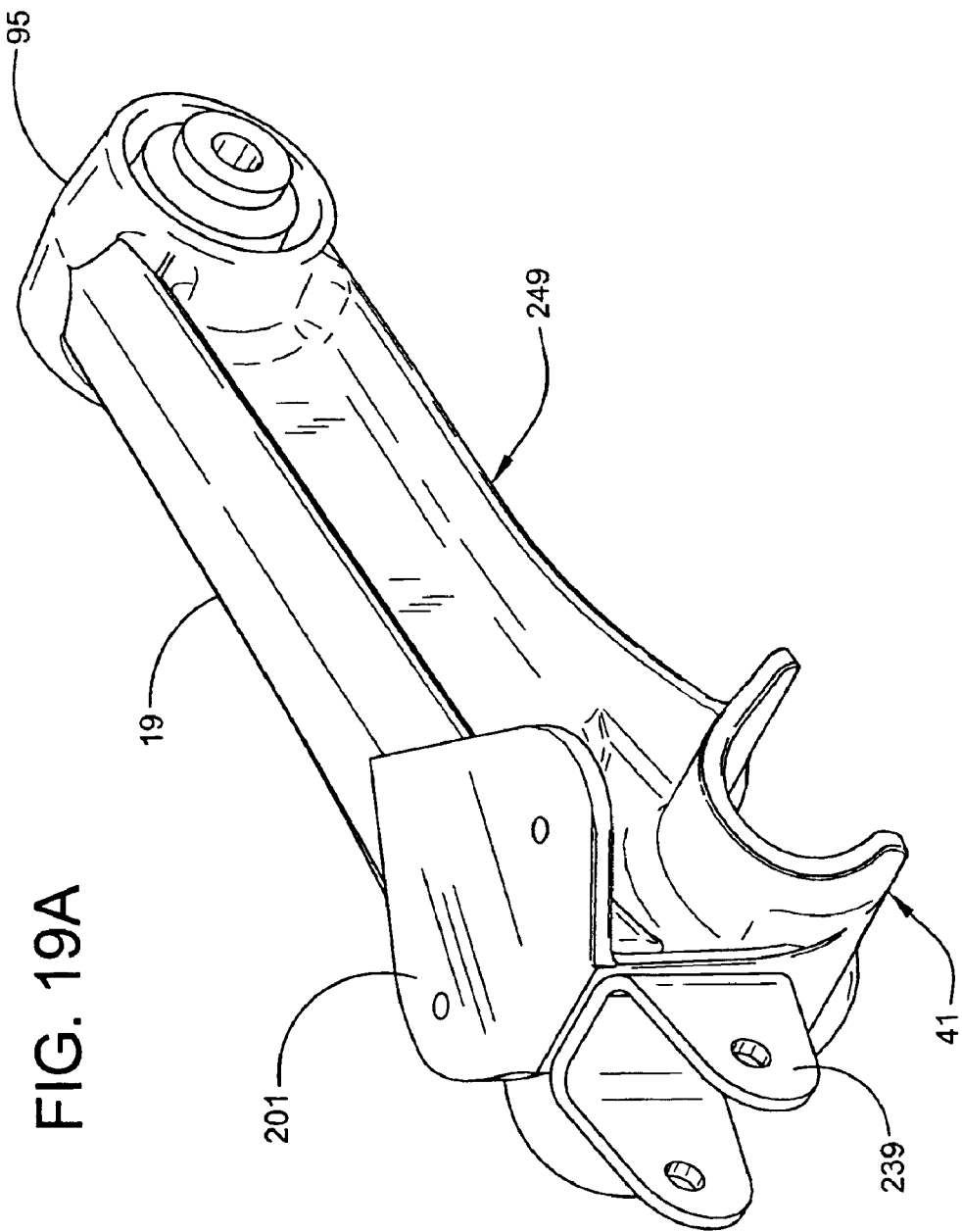

VEHICLE SUSPENSION

CROSS REFERENCE TO RELATED APPLICATIONS

This application claims priority from U.S. Provisional Application Ser. No. 60/368,443, filed Mar. 28, 2002, the entire disclosure of which is hereby incorporated herein by reference.

BACKGROUND OF THE INVENTION

This invention relates generally to vehicle suspensions, and more particularly to an improved suspension for single and tandem-axle trucks.

The present invention represents an improvement on the vehicle suspension described in pending PCT application S.N. PCT/US01/44121, filed Nov. 26, 2001, titled Vehicle Suspension System, assigned to The Holland Group, Inc., and published under International Publication No. WO 02/42097. A copy of this application was included as Appendix A in the above referenced provisional application from which priority is claimed in this application.

SUMMARY OF THE INVENTION

Among the several objects of this invention may be noted the provision of an improved vehicle suspension system which is lightweight and reduces the amount of torque applied to each axle; the provision of such a system which has good roll stability; the provision of such a system which eliminates "dock walk"; the provision of such a system which reduces "dock squat"; the provision of such a system which provides for easy axle alignment relative to the king pin of the vehicle, and which maintains axle alignment over the life of the vehicle; the provision of such a system which reduces the number of shock absorbers in the suspension; the provision of such a system which reduces tire wear; the provision of such a system which provides for better braking performance; the provision of such a system which distributes vehicle load substantially equally between axles, if there is more than one, and substantially equally over the length of each axle; the provision of a system which, in one embodiment, can be used on dry-freight trucks and, in another embodiment, can be used on flatbed trailers; and the provision of such a system which has an improved air bag design for controlling compression of the air bag and avoiding pinching of the bag.

In general, a vehicle suspension system of the present invention comprises a vehicle frame having a forward end, a rearward end and opposite sides, and a pair of levers carried by the frame intermediate the ends of the frame at opposite sides of the frame, each lever being pivotally mounted with respect to the frame for swinging movement on an axis intermediate opposite ends of the lever extending transverse to the frame. The system includes a pair of beams, one extending forward from one of the levers and the other extending forward from the other lever, each of the forward-extending beams having a pivot connection with the respective lever forward of the lever axis and having a support for a forward axle. The system also includes a pair of beams, one extending rearward from one of the levers and the other extending rearward from the other lever, each of the rearward-extending beams having a pivot connection with the respective lever rearward of the lever axis and having a support for a rearward axle. Two forward springs are each interposed between a respective forward-extending beam and the frame, and two rearward springs are each interposed between a respective rearward-extending beam and the frame. A pair of torque arms is carried by the frame forward of the forward-extending beams. Each torque arm has a first pivot connection with a respective beam and a second pivot connection with the frame forward of the first pivot connection with the beam. The torque arms function to restrict pivotal movement of the beams about their respective pivot connections with the levers thereby to reduce torsional forces applied to the forward axle.

In another aspect, a vehicle suspension system of this invention comprises a vehicle frame having a forward end, a rearward end and opposite sides. A pair of intermediate hangers is carried by the frame intermediate the ends of the frame at opposite sides of the frame. A pair of beams is provided, one extending forward from one of the intermediate hangers and the other extending forward from the other intermediate hanger. Each of the forward-extending beams has a pivot connection with the respective intermediate hanger and has a support for a forward axle forward of said pivot connection. Two air springs are interposed between respective forward-extending beams and the frame. The system also includes a pair of torque arms, each having a pivot connection with a respective forward-extending beam and a pivot connection with the frame forward of said pivot connection with the beam. The torque arms function to restrict pivotal movement of the beams about their respective pivot connections with the first intermediate hangers thereby to reduce torsional forces applied to the forward axle.

The present invention is also directed to a vehicle suspension system comprising a vehicle frame having a forward end, a rearward end and opposite sides, and a pair of first levers carried by the frame intermediate the ends of the frame at opposite sides of the frame, each lever being pivotally mounted with respect to the frame for swinging movement on an axis intermediate opposite ends of the lever extending transverse to the frame. The system includes a pair of beams, one extending forward from one of the first levers and the other extending forward from the other of the first levers, each of the forward-extending beams having a pivot connection with a respective first lever and having a support for a forward axle forward of said pivot connection. Forward springs are each interposed between a respective forward-extending beam and the frame. The system further comprises a pair of forward torque arms, each having a pivot connection with a respective forward-extending beam and a pivot connection with the frame forward of said pivot connection with the beam. The forward torque arms function to restrict pivotal movement of the beams about their respective pivot connections with the levers thereby to reduce torsional forces applied to the forward axle. The system also includes a pair of second levers carried by the frame intermediate the ends of the frame at opposite sides of the frame at locations rearward of said first levers, each second lever being pivotally mounted with respect to the frame for swinging movement on an axis intermediate opposite ends of the second lever extending transverse to the frame. A pair of tie bars at opposite sides of the frame connects the first and second levers. Each tie bar has a pivot connection with one of the first levers and a pivot connection with one of the second levers. The system further comprises a pair of beams, one extending rearward from one of the second levers and the other extending rearward from the other second lever, each of said rearward-extending beams having a pivot connection with the respective second lever and having a support for a rear axle rearward of said pivot connection. Rearward springs are interposed between respective rearward-extending beams and the frame. A pair of rearward torque arms is provided, each having a pivot connection with a respective rearward-extending beam and a pivot connection with the frame rearward of the pivot connection with the beam. The rearward torque arms function to restrict pivotal movement of the rearward-extending beams about their respective pivot connections with the second levers thereby to reduce torsional forces applied to the rearward axle.

Other objects and features will be in part apparent and in part pointed out hereinafter.

BRIEF DESCRIPTION OF THE DRAWINGS

FIG. 10 is a perspective of an intermediate hanger with a bushing assembly.

FIG. 10A is a perspective of an alternative intermediate hanger and bushing assembly.

FIG. 11A is an perspective view of an alternative bushing member.

FIG. 19 is a perspective of a rearward-extending beam.

FIG. 19A is a perspective of an alternative rearward-extending beam.

Corresponding parts are designated by corresponding reference numbers throughout the drawings.

DESCRIPTION OF PREFERRED EMBODIMENTS

Figure 1:
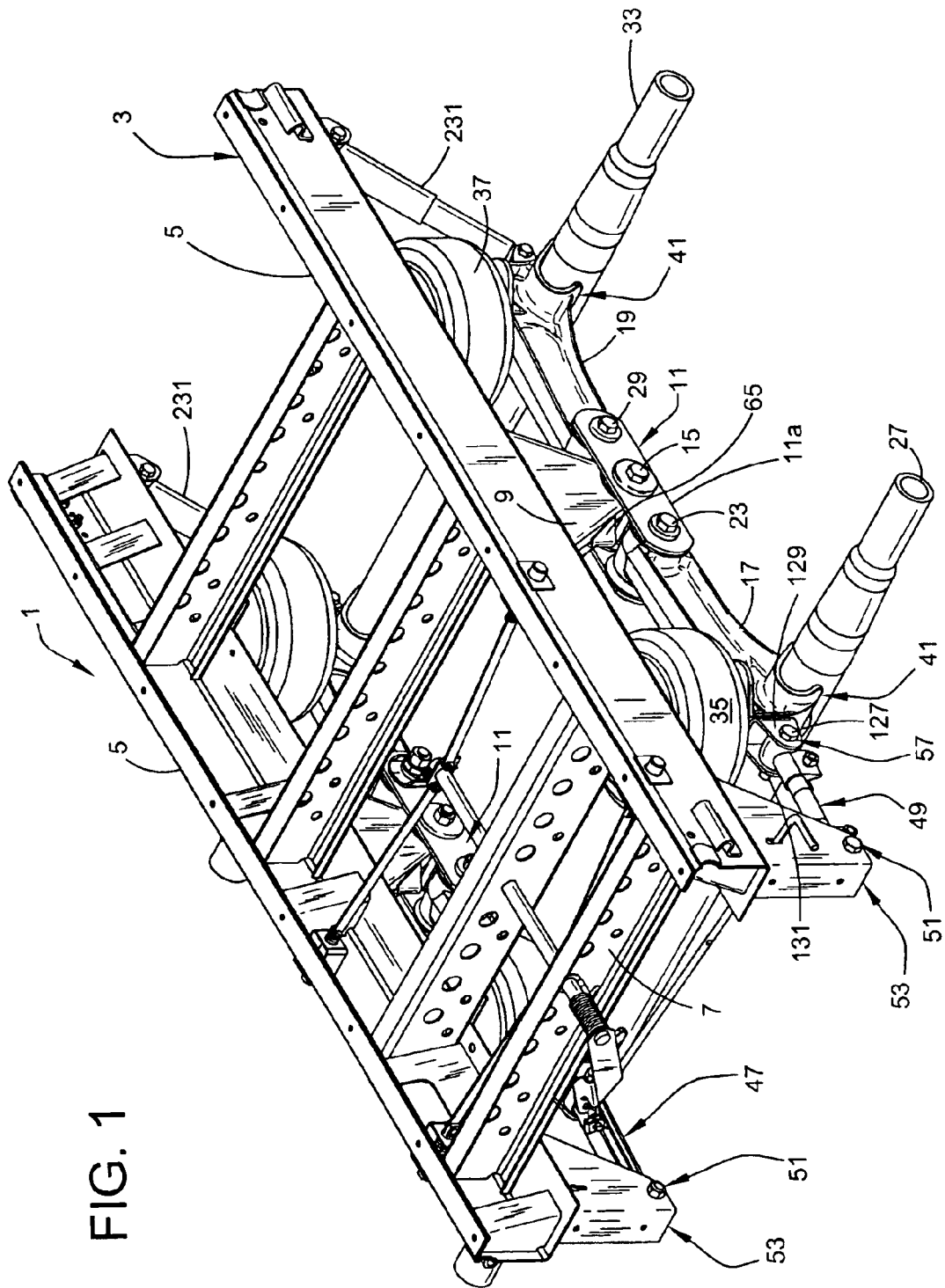
FIG. 1 is a perspective of one embodiment of a vehicle suspension system of the present invention.

Referring to FIG. 1, a vehicle suspension of the present invention is designated in its entirety by the reference numeral 1. As shown, the suspension is a slider of the type which is affixed to the frame of truck (e.g., a dry-freight truck). However, it will be understood that the present invention has applications to vehicle suspensions generally.

The suspension 1 comprises a frame 3 which includes a pair of parallel rails 5 connected by cross members 7, and a pair of intermediate hangers 9 depending from the rails 5 at opposite sides of the frame generally midway between the ends of the rails. The frame has forward and rearward ends, the forward end being the left end as viewed in FIG. 1 and the rearward end being the opposite (right) end. In accordance with one aspect of the present invention, the frame further comprises a pair of levers 11, referred to as equalizers, one at one side of the frame 3 and the other at the other side of the frame. Each lever 11 (comprising two flat parallel bars 11a, 11b in the embodiment shown in FIGS. 1–5) has a pivot connection, generally designated 15, with a respective intermediate hanger 9 for swinging movement on a generally horizontal axis 16 intermediate opposite ends of the lever transverse to the frame. The frame also includes a pair of rigid suspension beams 17 (sometimes referred to as "walking" beams) extending forward from one end of the levers 11, and a pair of rigid suspension ("walking") beams 19 extending rearward from the other end of the levers. Each of the forward-extending beams 17 has a pivot connection 23 with the respective lever 11 forward of the lever pivot connection 15 and further supports a forward axle 27. Each of the rearward-extending beams 19 has a pivot connection 29 with the respective lever 11 rearward of the lever pivot connection 15 and supports a rearward axle 33. A forward pair of springs 35 (e.g., air bags) is interposed between respective forward-extending beams 17 and the frame 3, and a rearward pair of springs 37 (e.g., air bags) is interposed between respective rearward-extending beams 19 and the frame 3. The forward and rearward beams 17, 19 carry axle supports, each generally designated 41, for supporting the respective axles on the beams. In one embodiment, each rigid suspension beam 17, 19 comprises a one-piece cast beam having a generally I-beam cross section, but it will be understood that each beam may have other configurations (e.g., an elongate member of tubular steel having a rectangular cross section) without departing from the scope of this invention.

In accordance with one aspect of this present invention, the suspension system 1 also includes a pair of torque arms at opposite sides of the frame, the curbside torque arm as viewed in FIG. 1 being designated 47 and the roadside torque arm being designated 49. Each torque arm has a pivot connection 51 adjacent its forward end with a forward hanger 53 depending from a respective rail 5 of the frame, and a pivot connection 57 adjacent its rearward end with a respective forward-extending beam 17. As will be explained in greater detail below, the torque arms 47, 49 function to inhibit or restrain downward movement of the forward axle 27 during braking of the vehicle, thereby reducing torsional forces applied to the axle.

As will be described, the equalizing levers 11 function to permit the rigid suspension beams 17, 19 to move essentially independently of one another, so that the loading on the wheels of the vehicle is maintained substantially uniform as the vehicle moves over bumps in the road and as the vehicle turns. The suspension 1 provides good roll stability or stiffness, i.e., resistance to rollover during cornering, and minimizes axle torque, especially during travel over bumps, potholes and the like. For efficient operation, the levers 11 are maintained in a generally horizontal neutral position by the resilient nature of the pivot connections 15, although other means may be used, e.g., coil compression springs, rubber springs, or linkages.

Figure 6:
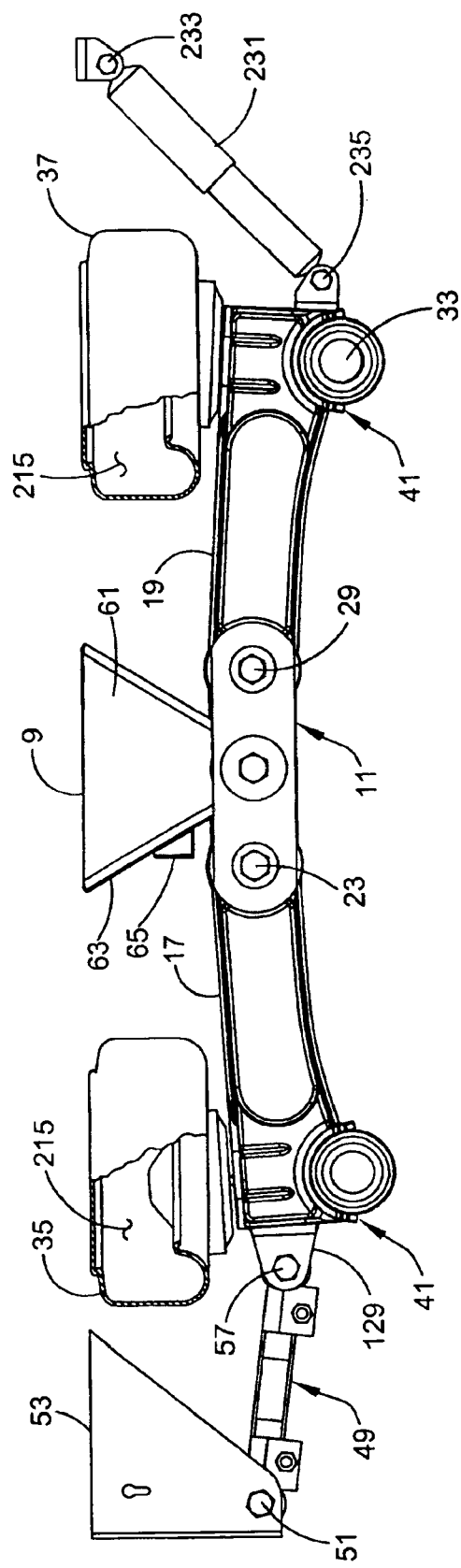
FIG. 6 is a view similar to FIG. 3 but with the rails and cross members removed.
Figure 7:
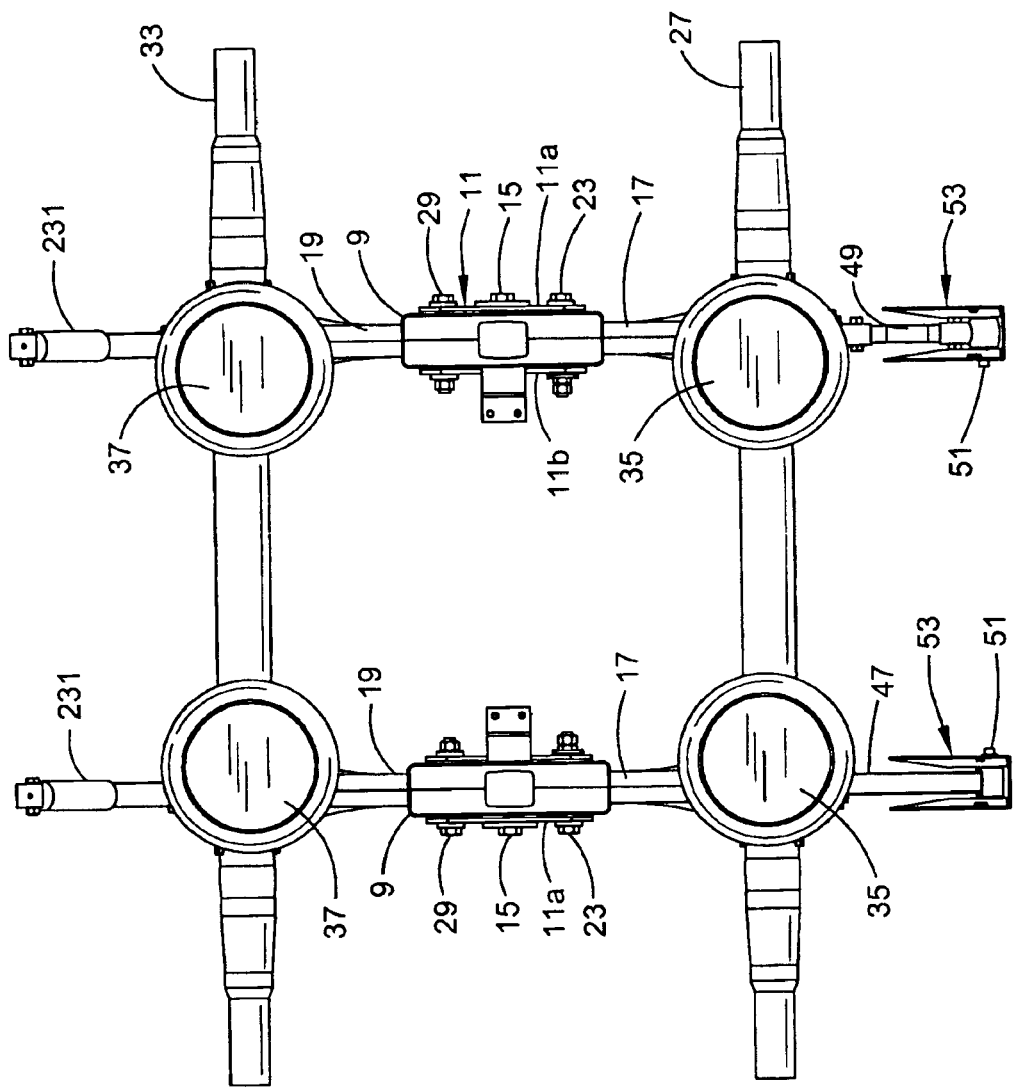
FIG. 7 is a top plan view of the suspension of FIG. 6.
Figure 8:
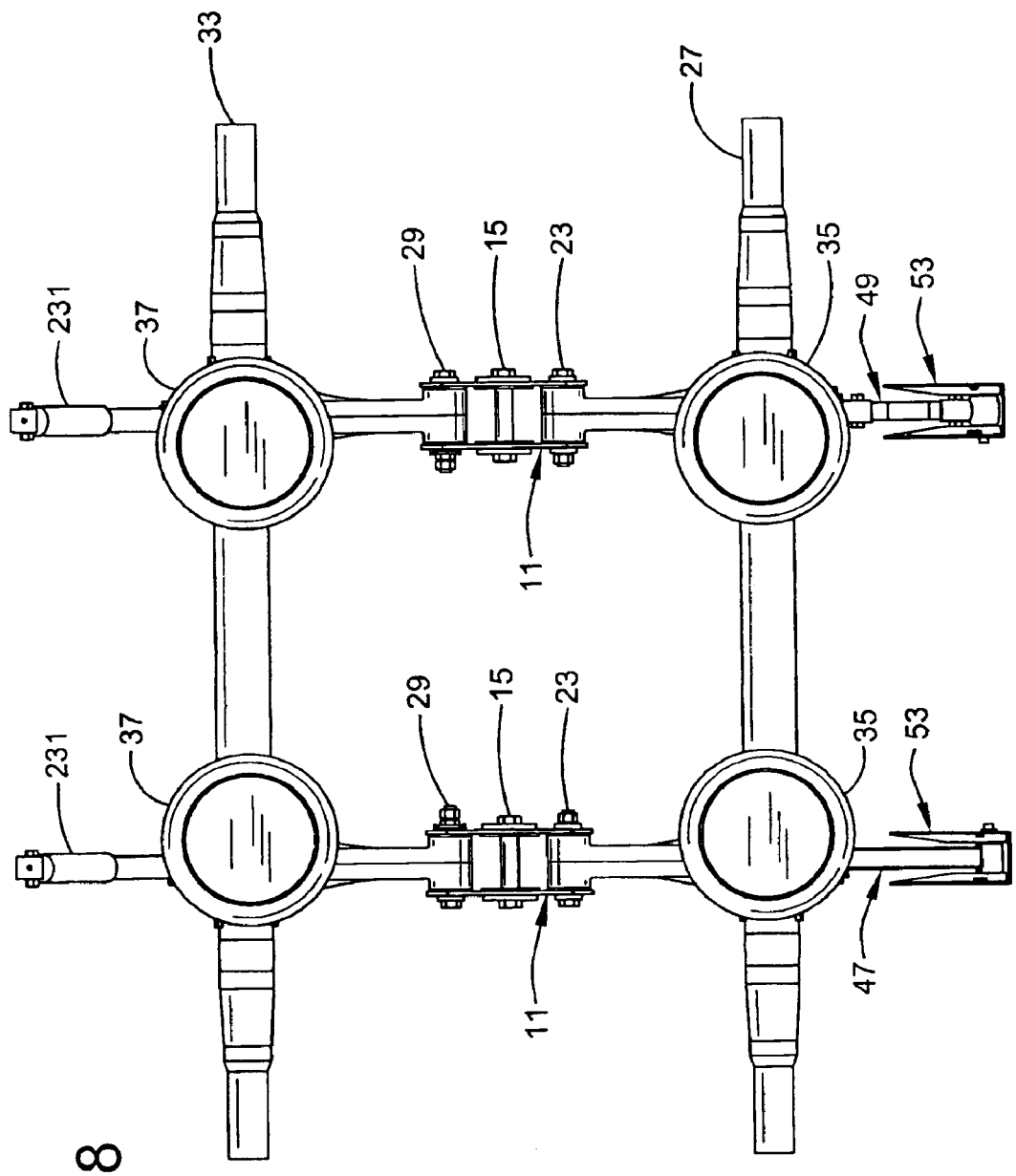
FIG. 8 is a view similar to FIG. 7 but with a pair of intermediate hangers removed.
Figure 9:
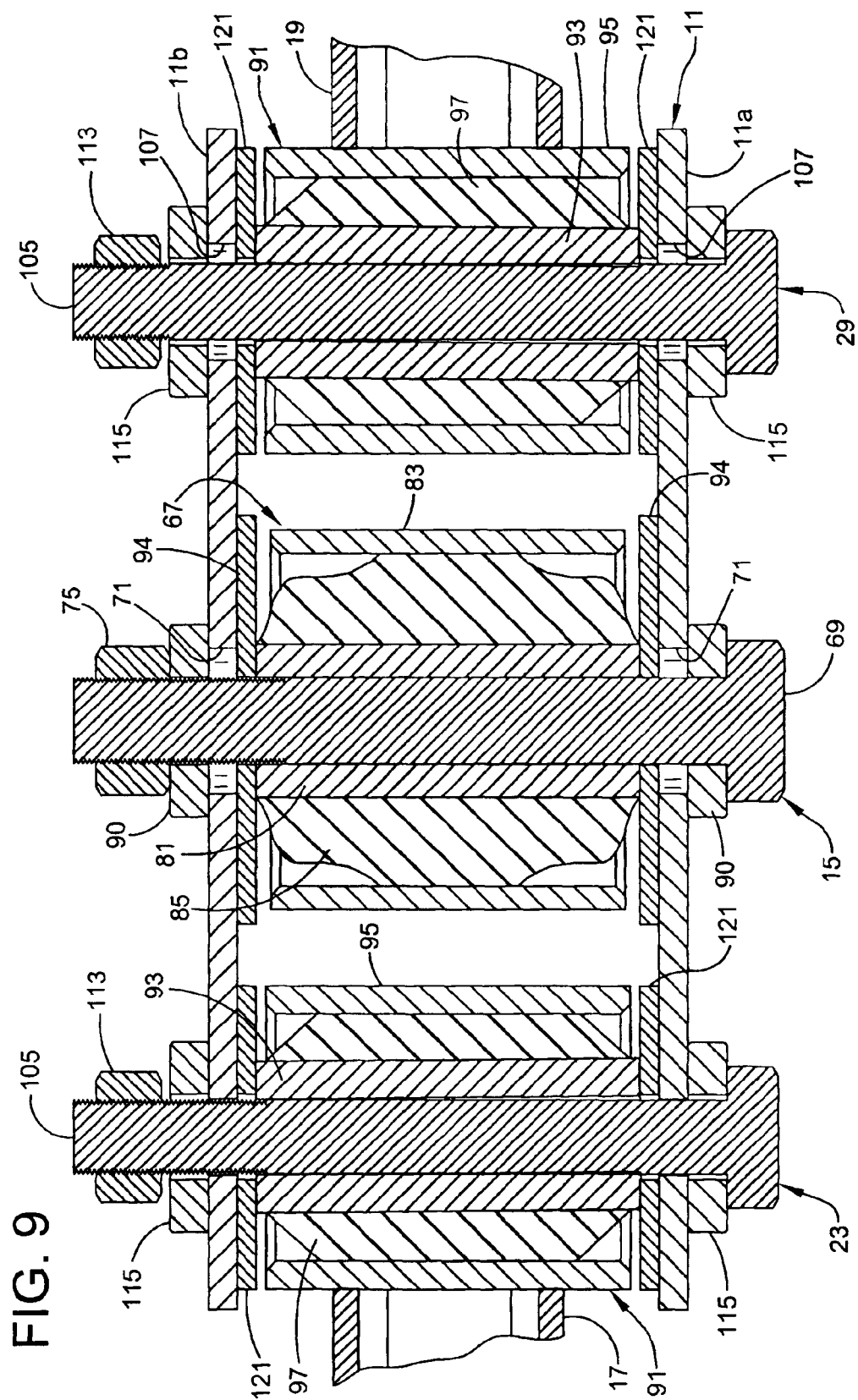
FIG. 9 is an enlarged horizontal section taken along the plane including line 9—9 of FIG. 5 showing one embodiment of an equalizer lever.

In the embodiment illustrated in FIGS. 6 and 10, each intermediate hanger 9 is located generally centrally of the frame and comprises a hollow structure having triangular sides 61 and downwardly converging ends 63. In the embodiment of FIG. 10A, a stop 65 is attached (i.e., welded) to the front wall 63 of each hanger 9 to limit the range of pivoting movement of levers 11 about horizontal axis 16. The two bars of each equalizing lever 11 are preferably disposed on opposite sides 61 of a respective hanger 9 adjacent its lower end. The pivot connection 15 between the equalizing lever 11 and the intermediate hanger 9 at each side of the frame is shown in FIG. 9 as comprising a bushing assembly generally designated 67, a pivot bolt 69 passing through the bushing assembly and aligned openings 71 in the equalizer bars 11a, 11b, and a nut 75 threaded up on the bolt. The bushing assembly 67 is preferably constructed in a manner similar to the bushing assembly 379 in the aforementioned PCT application published as International Publication No. WO 02/42097, comprising inner and outer concentric metal sleeves 81, 83 and a bushing member 85 having a co-axial friction fit between the sleeves. As shown in FIG. 10, the outer sleeve 83 is rigidly attached, as by welding, to the hanger 9.

In one embodiment, the bushing member 85 is similar to the bushing member 411 of the prior application, except that it is rotated 90 degrees so that the outer surface of the member is relieved in a radially inward, generally horizontal (rather than vertical) direction. As a result, the bushing member 85 is less yielding in the vertical direction and more yielding in the horizontal direction. As seen in FIG. 9, conventional washers 90 are provided on the pivot bolt 69 between the lever bars 11a, 11b and the head of the bolt and the nut 75. Hardened wear washers 94 are disposed between the ends of the bushing assembly 67 and the lever bars 11a, 11b. When the nut 75 is tightened on the pivot bolt 69, the lever bars 11a, 11b, wear washers 94 and inner sleeve 81 of the bushing assembly 67 are clamped in fixed position relative to one another and pivot as a unit on the axis of the pivot bolt relative to outer sleeve 83 affixed to the hanger 9 to the extent permitted by the flexing of the resilient bushing member 85. Such pivotal movement occurs as the equalizing lever 11 pivots on the pivot bolt 69 in response to up and down movement of the suspension beams 17, 19 to equalize the forces on the axles 27, 33 carried by the beams. The outer sleeve 83 is shorter than the inner sleeve 81 to reduce friction during such pivotal movement. Angular movement of the lever bars 11a, 11b relative to the outer sleeve 83 is limited by contact between the ends of the outer sleeve and the hardened wear washers 94. The resilience of the bushing member 85 urges the lever 11 back toward a neutral (horizontal) position. The bushing member is of a suitable material, such as rubber, preferably having a Shore A durometer in the range of about 60–70 and more preferably about 70.

It will be noted that the openings 71 in the equalizing bars 11a, 11b are clearance openings substantially larger in diameter than the shank diameter of the pivot bolt 69. This allows for fore and aft movement of the equalizing levers 11 and associated beams 17, 19 relative to the intermediate hangers 9 to permit adjustment of the respective ends of the axles 27, 33 carried by the beams 17, 19 to attain precise alignment of the axles transversely of the vehicle. (When properly aligned, the front and rear axles carried by the suspension beams should be parallel to one another and perpendicular to the longitudinal centerline of the trailer, typically extending through the kingpin of the vehicle.)

Figure 11:
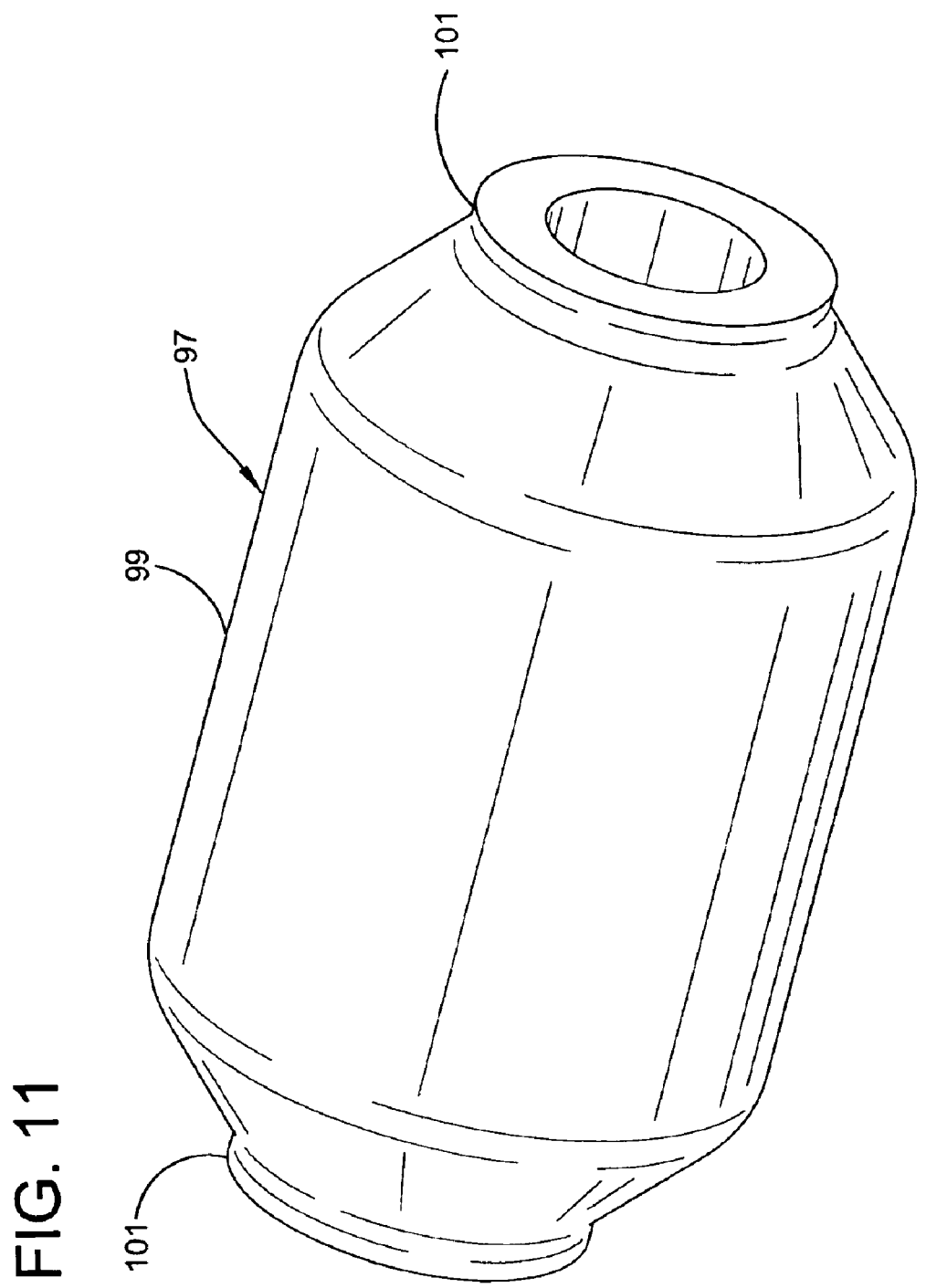
FIG. 11 is a perspective view of a bushing member.

One embodiment of the construction of the pivot connections 23, 29 between the equalizing levers 11 and the beams 17, 19 also is shown in FIG. 9. As illustrated, each such pivot connection is similar to the connections 23, 29 described in the prior PCT application and comprises a bushing assembly, generally designated 91, between the bars 11a, 11b of the equalizing lever 11 adjacent an end of the lever. The bushing assembly 91 includes concentric inner and outer sleeves 93, 95 surrounding a resilient bushing member 97 having a press (frictional) fit with the outer sleeve and being bonded to the inner sleeve. In one embodiment (FIG. 11), the bushing member 97 has a cylindric center portion 99 and opposite end portions 101 of reduced diameter, the bushing member being generally symmetric about its longitudinal axis to provide equal compressibility in vertical and horizontal directions. The bushing member is of rubber preferably having a Shore A durometer in the range of about 60–70, and more preferably about 70. The outer sleeve 95 of the bushing assembly is affixed (e.g., welded) to the end of a respective beam 17, 19. The assembly is held in place by a pivot bolt 105 extending through the inner sleeve 93 and aligned holes 107 in the lever bars 11a, 11b, and a nut 113 threaded up on the bolt against one of the bars. Conventional washers 115 are provided on the pivot bolt 105 between the lever bars 11a, 11b and the head of the bolt and the nut 113. Hardened metal wear washers 121 are provided between the ends of the inner sleeve 93 and the lever bars 11a, 11b. When the nut 113 is tightened, the inner sleeve 93 and washers 121 are clamped in fixed (non-rotating) position relative to the lever bars 11a, 11b. The outer sleeve 95 is somewhat shorter than the inner sleeve 93 to provide gaps between the ends of the sleeve and the washers. The resilience of the bushing member 97 provides limited rotational and angular movement between the inner and outer sleeves 93, 95 of the bushing assembly to permit limited pivotal and angular movement between the respective beam 17, 19 and the lever 11. Angular movement of the outer sleeve 95 relative to the inner sleeve 93 of the bushing (caused by jackknife forces exerted on the beam) is limited by contact between the ends of the outer sleeve and the hardened washers 121. The ends of the bushing member 97 are tapered to prevent undue rubbing of the bushing member against the washers 121.

Figure 9A:
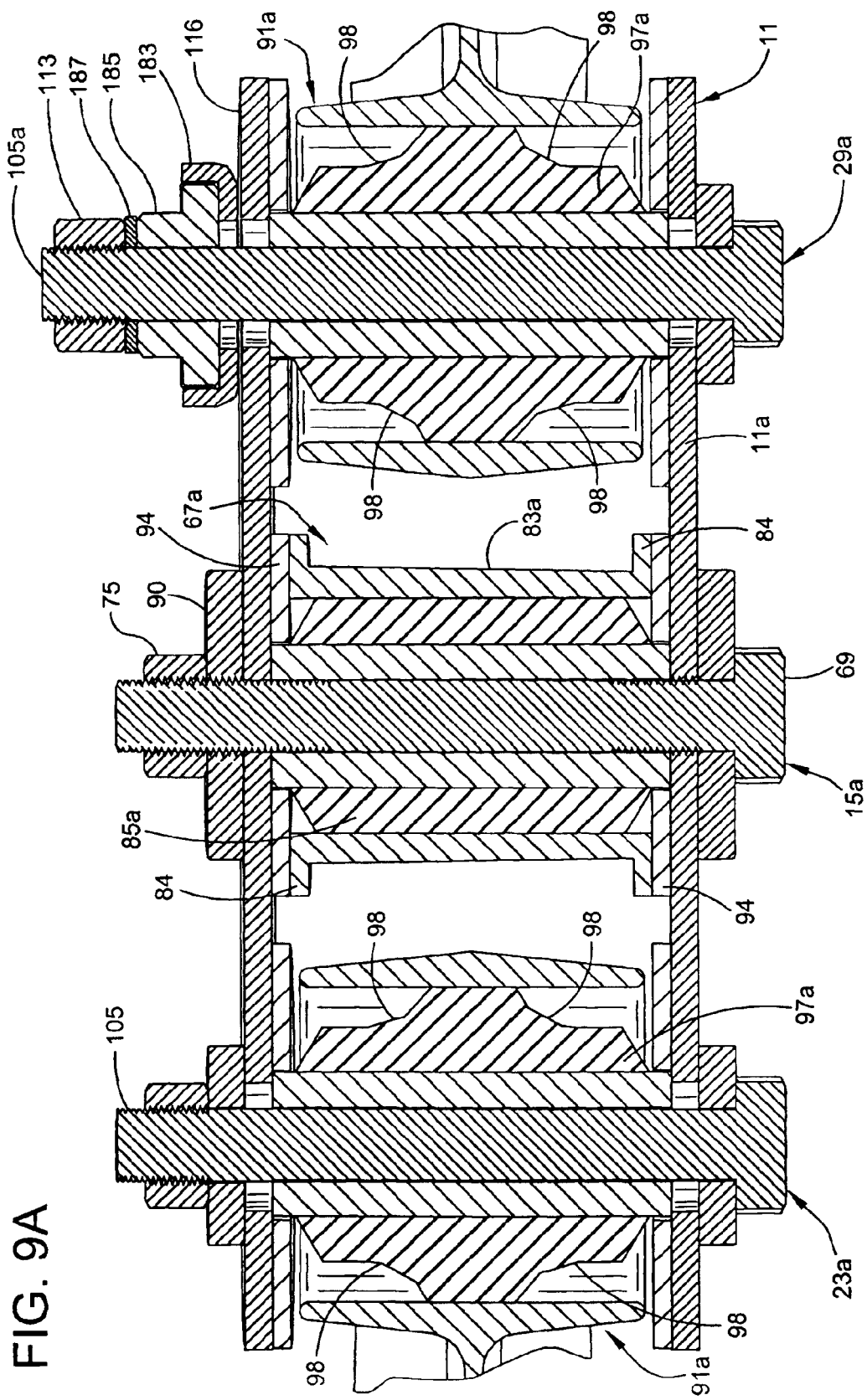
FIG. 9A is a horizontal section showing alternative pivot connections of an equalizer lever.

An alternative embodiment for the pivot connection 15 between the lever 11 and a respective hanger 9 and the pivot connections 23, 29 between the lever 11 and the beams 17, 19 is shown in FIGS. 9A, 10A, and 11A. This embodiment includes an alternative pivot connection 15a between the equalizing lever 11 and the intermediate hanger 9 and comprises a bushing assembly generally designated 67a. The bushing assembly 67a of this embodiment is substantially similar to bushing assembly 67 of FIG. 9 except a bushing member 85a is provided. As shown in FIGS. 9A and 10A, bushing member 85a is symmetric about its longitudinal axis to provide equal compressibility in vertical and horizontal directions. The bushing member 85a is received in an outer sleeve 83a having a flange 84 at each end that abuts against the hardened wear washers 94.

In the embodiment of FIG. 9A, alternative pivot connections 23a, 29a between the lever 11 and respective beams 17, 19 comprise an alternative bushing assembly, generally designated 91a. The bushing assembly 91a of this embodiment is substantially similar to bushing assembly 91 of FIG. 9 except a resilient bushing member 97a is provided. As shown in FIGS. 9A and 11A, the bushing member 97a is constructed so that the outer surface of the member is relieved in a radially inward, generally horizontal direction. Four cutouts 98 (only two of which are shown in FIG. 11A) are provided in the outer surface of the bushing member 97a so that the member is less yielding in the vertical direction and more yielding in the horizontal direction. As shown in FIG. 9A, pivot connection 29a also comprises locking hardware including a longer bolt 105a, a lock plate 183 attached (i.e., welded) to lever bar 116 that receives a lock washer 185, and a hardened wear washer 187 compressed between the threaded nut 113 and the lock washer.

Figure 15:
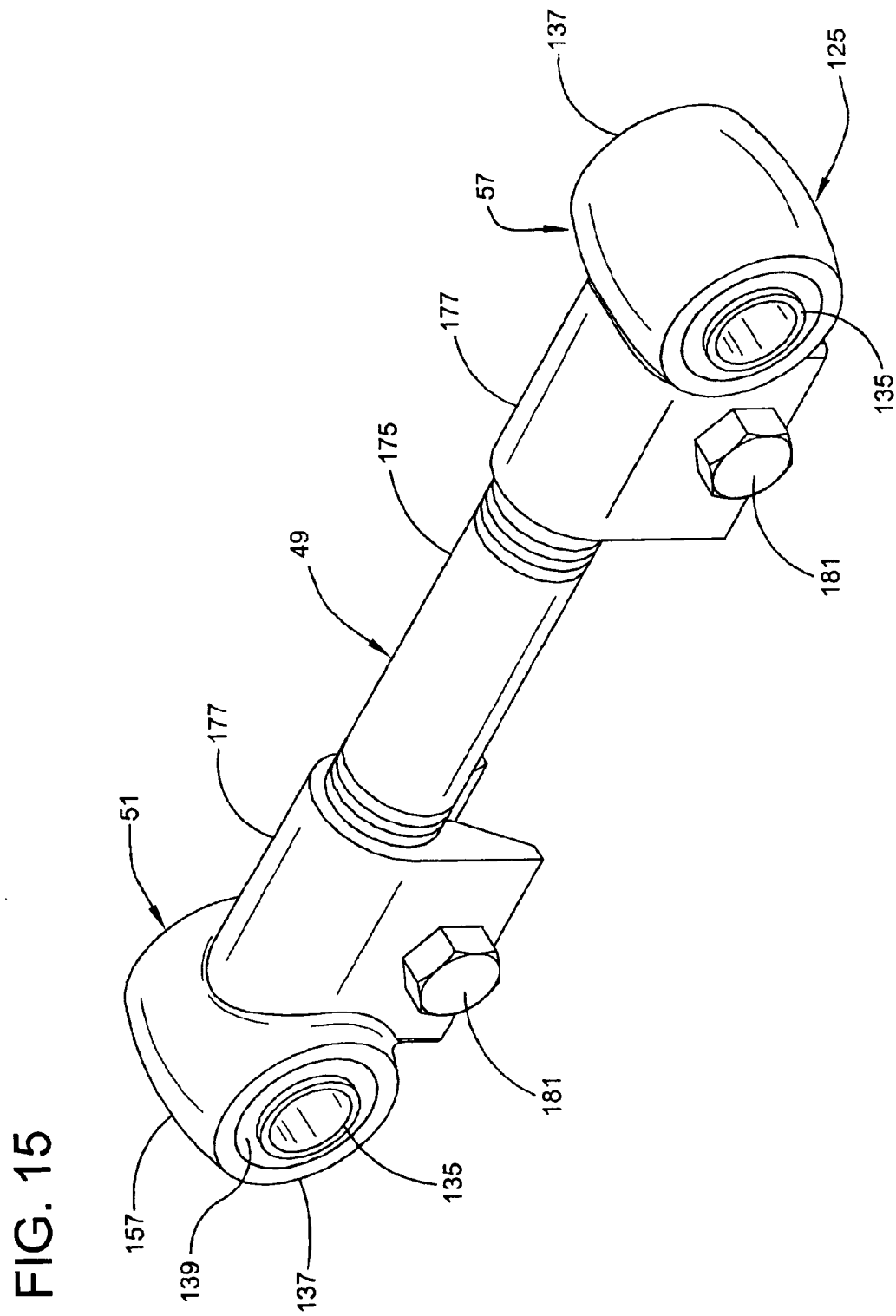
FIG. 15 is a perspective of a roadside torque arm with a forward pivot connection and rearward pivot connection.
Figure 16:
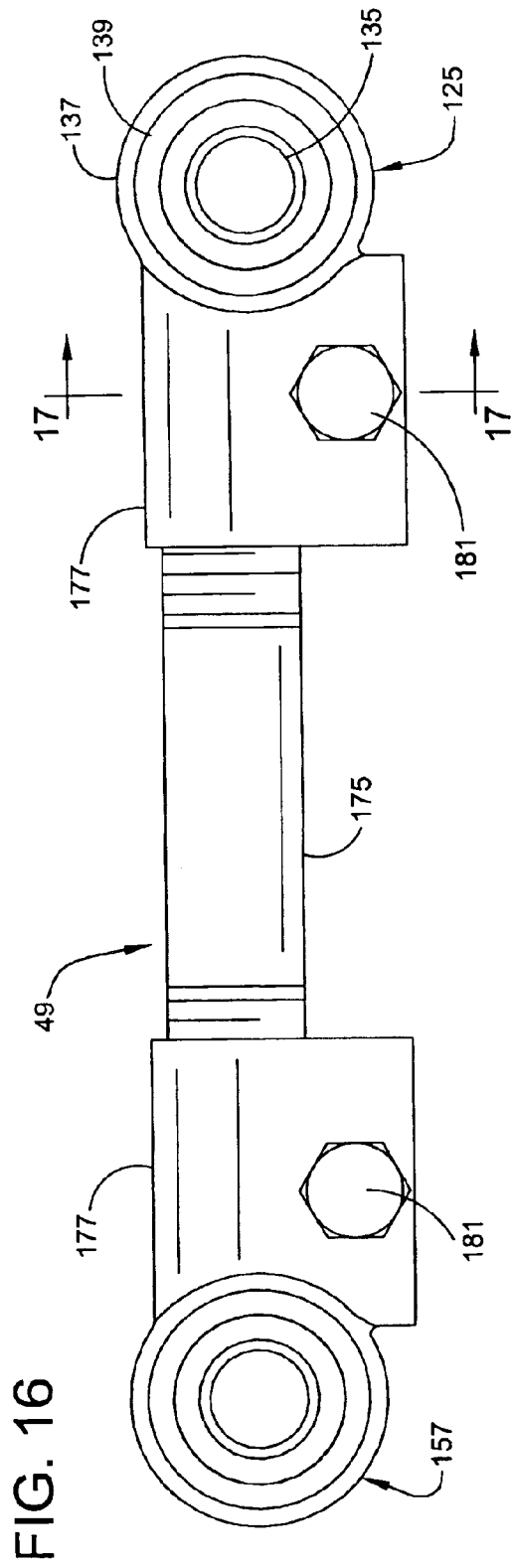
FIG. 16 is a side elevation of FIG. 15.
Figure 17:
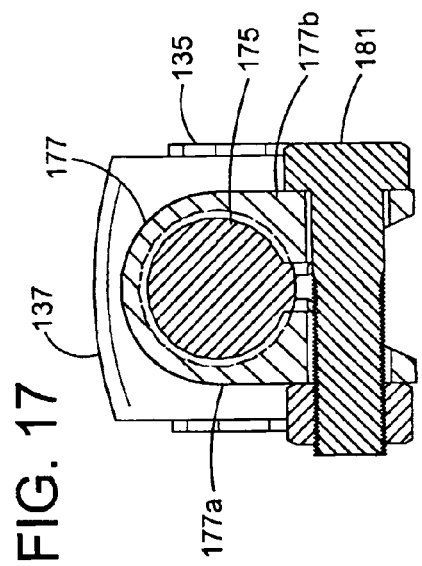
FIG. 17 is a section taken along the plane including line 17—17 of FIG. 16.

The connection 57 between each torque arm 47, 49 and its respective forward-extending beam 17 is illustrated in FIGS. 5 and 15–17, portions of the connection being omitted in FIGS. 15–17 for purposes of illustration. The connection 57 is essentially identical to the pivot connections 23, 29 shown in FIG. 9 and described above. The connection 57 comprises a bushing assembly, generally designated 125, a pivot bolt 127 (FIG. 5) passing through the bushing assembly and aligned openings in opposing mounting lugs 129 on the beam 17, and a nut 131 tightened on the bolt. The bushing assembly 125 comprises inner and outer metal sleeves 135, 137, concentrically disposed, and a resilient bushing member 139 having a friction fit with the sleeves. Hardened metal wear washers (not shown) are provided between the ends of the inner sleeve 135 and the mounting lugs 129. In one embodiment, the bushing member is a cylindric member of rubber preferably having a Shore A durometer in the range of about 60–70 and more preferably about 70. The bushing member 139 preferably has the same resistance to compression in both vertical and fore-and-aft (horizontal) directions. When the nut 131 (FIG. 5) is tightened, the inner sleeve 135 and washers are clamped in fixed (non-rotating) position relative to the mounting lugs 129. The outer sleeve 137 is somewhat shorter than the inner sleeve 135 to provide gaps between the ends of the sleeve and the washers. The resilience of the bushing member 139 provides limited rotational and angular movement between the inner and outer sleeves 135, 137 of the bushing assembly 125 to permit limited pivotal and angular movement between the torque arm 47, 49 and respective beam 17. Angular movement of the outer sleeve 137 relative to the inner sleeve 135 of the bushing (caused by jackknife forces exerted on the beam) is limited by contact between the ends of the outer sleeve and the hardened washers. The ends of the bushing member 139 are tapered to prevent undue rubbing of the bushing member against the washers.

Figure 5:
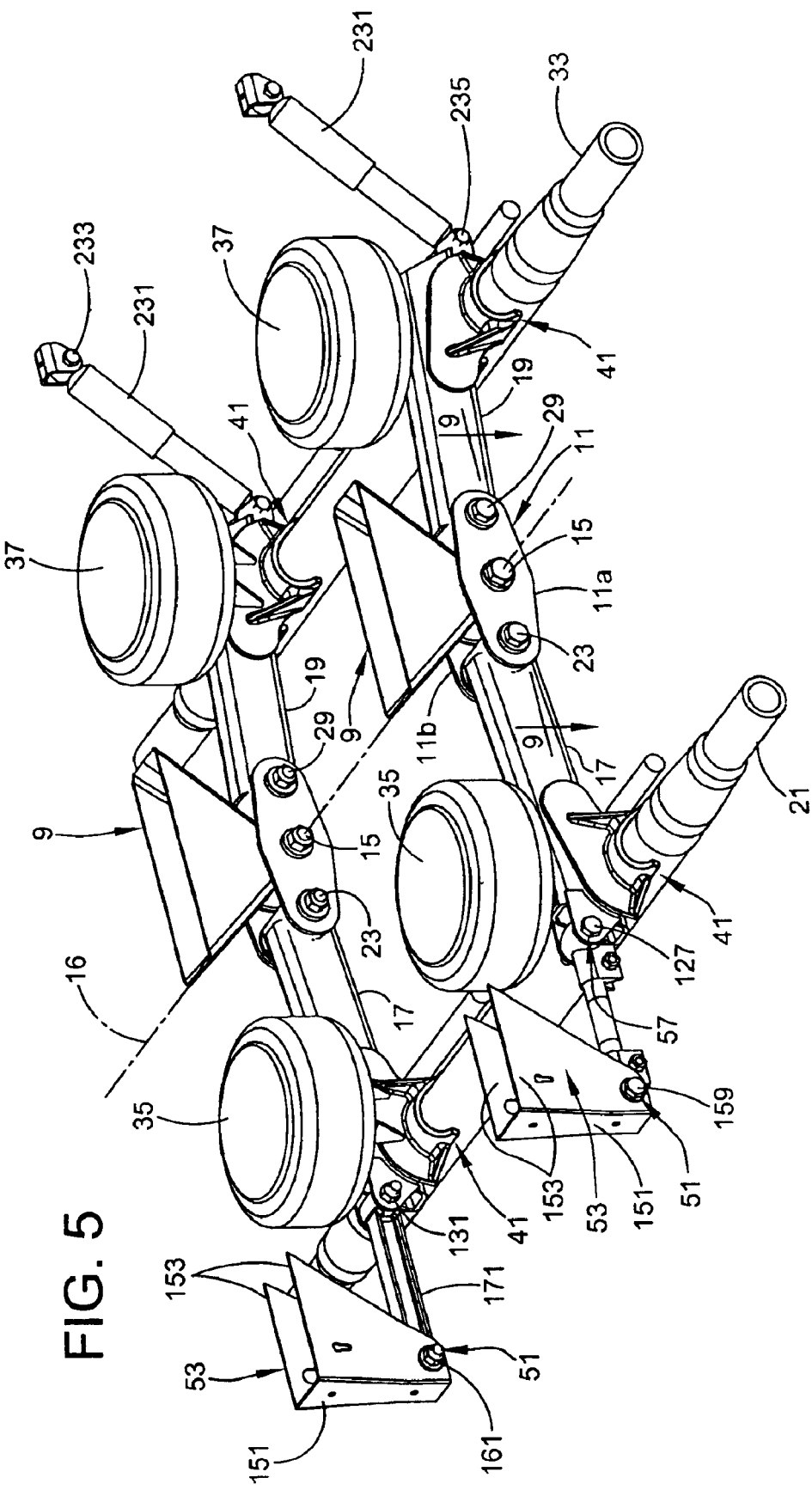
FIG. 5 is a perspective of the suspension with rails and cross members of a frame removed.

Each forward hanger 53 is generally of channel shape (see FIG. 5). The hanger has a front vertical wall 151, and a pair of spaced apart side walls 153 extending rearward from the front wall. The preferred construction of the pivot connection 51 between each torque arm 47, 49 and its respective forward hanger 53 is illustrated in FIGS. 5 and 15. The connection comprises a bushing assembly, generally designated 157, a pivot bolt 159 passing through the bushing assembly and aligned openings in opposing side walls 153 of the hanger 53, and a nut 161 tightened on the bolt. The bushing assembly 157 is preferably identical to the bushing assembly 125 between the torque arm 47, 49 and respective forward-extending beam, and corresponding parts are identified by the same reference numbers. When the nut 161 of the connection is tightened, the inner sleeve 135 and washers (not shown) are clamped in fixed (non-rotating) position relative to the forward hanger 53. The outer sleeve 137 is somewhat shorter than the inner sleeve 135 to provide gaps between the ends of the sleeve and the washers. The resilience of the bushing member 139 provides limited rotational and angular movement between the inner and outer sleeves 135, 137 of the bushing assembly to permit limited pivotal and angular movement between the torque arm 47, 49 and respective forward hanger 53.

The resilient pivot connections 51, 57 between the torque arms 47, 49 and their respective beams 17 and forward hangers 53 should have a resistance to compression in the horizontal direction greater than that of the center pivot connections 15 between the equalizing levers 11 and respective intermediate hangers 9, and preferably greater than that of the pivot connections 23 between the equalizing levers 11 and the forward-extending beams 17. This resistance to compression can be controlled by the wall thickness of the bushing members of the various connections. For example, the bushing member 85 of the center pivot connection of the equalizing lever preferably has the largest wall thickness (e.g., 1.2 in.); the bushing members 97 of the pivot connections 23 between the levers 11 and respective beams 17 preferably have a somewhat smaller wall thickness (e.g., 0.625 in.); and the bushing members 139 of the torque arm pivot connections 51, 57 preferably have the smallest wall thickness, thereby providing the greatest resistance to compression and thus being the "dominant" bushing members. The relative compressibilities of the bushing members in the fore-and-aft direction can also be controlled by engineering the shape and contour of the bushing members, as will be understood by those skilled in this field. In any event, the relative "softness" (compressibility) of the center lever pivot connections 15 in the fore-and-aft direction permits the equalizing levers 11 to shift forward a relatively short distance (e.g., ⅝ in.) relative to the intermediate hangers 9 as the forward-extending beams 17 pivot, as during braking, for example. This shifting movement permits the torque arms 47, 49 to rotate to allow up and down movement of the front axle 27 through a limited range of vertical travel (e.g., six inches of axle travel, three inches up and three inches down) from a neutral position, as indicated by the distance D in FIG. 14. The precise range of travel is determined by the compressibility of the center lever pivot connections 15 and, to a lesser extent, by the compressibility of the pivot connections 23 between the levers 11 and respective forward-extending beams 17, and the compressibility of the pivot connections 57 between the beams 17 and the torque arms 47, 49. Because the torque arms limit vertical movement of the forward axle, e.g., downward axle movement during braking, torsional forces on the front axle 27 are reduced. Further, the torque arms 47, 49 eliminate the need for front shock absorbers.

Referring to FIG. 5, one of the torque arms (e.g., the curbside arm 47) preferably comprises a one-piece metal bar 171 of suitable (e.g., I) cross section affixed, as by welding, at its forward end to the outer sleeve 137 of the bushing assembly 157 of the pivot connection 51, and at its rearward end to the outer sleeve 137 of the bushing assembly 125 of the pivot connection 57. The other (e.g., roadside) torque arm 49 can be of the same construction, or it can be of adjustable length to permit alignment of the axles in a manner which will be described. In the preferred embodiment, shown in FIGS. 15–17, the arm 49 is adjustable. It comprises a rod 175 and a pair of end fittings 177 at opposite ends of the rod affixed, as by welding, to the outer sleeves 137 of the bushing assemblies 125, 157. The rod 175 has a threaded connection with at least one and preferably both fittings 177 so that the overall length of the torque arm 49 can be varied by rotating the rod on its axis relative to the fittings. In one embodiment (see FIGS. 15–17), each fitting is generally U-shaped and has a pair of opposing sections 177a, 177b defining an internally threaded bore for receiving a respective end of the torque arm 49, and a nut and bolt fastener 181 which can be loosened to permit threading of the torque arm relative to the fitting and tightened to draw the two sections 177a, 177b toward one another to clamp the torque arm against further rotation. Other means can be used for releasably holding the torque arm against rotation.

The adjustable torque arm 49 can be used to align the axles 27, 33 of the vehicle so that they are precisely perpendicular to the central longitudinal axis of the vehicle. The adjustment procedure is carried out by adjusting the length of the adjustable torque arm 49 while the center pivot bolt 69 of the equalizing lever 11 at the same side (e.g., roadside) of the vehicle is loose and the center pivot bolt 69 at the opposite side (e.g., curbside) of the vehicle is tight. This adjustment effects movement of the axles 27, 33 until they are precisely perpendicular to the vehicle longitudinal centerline. The fasteners 181 of the torque arm 49 and the center roadside pivot bolt 69 are then tightened to lock the axles in aligned position. In the event the axles need to be adjusted to bring them into parallel with one another, this can be effected by loosening the pivot bolts 105 connecting the beams 17, 19 and the equalizing levers 11, making the necessary adjustments, and tightening the nuts 113 on the bolts. The slots 107 in the bars 11a, 11b of the equalizing levers 11 permit these adjustments to be made without stressing the resilient bushing members 85, 97.

Figure 18:
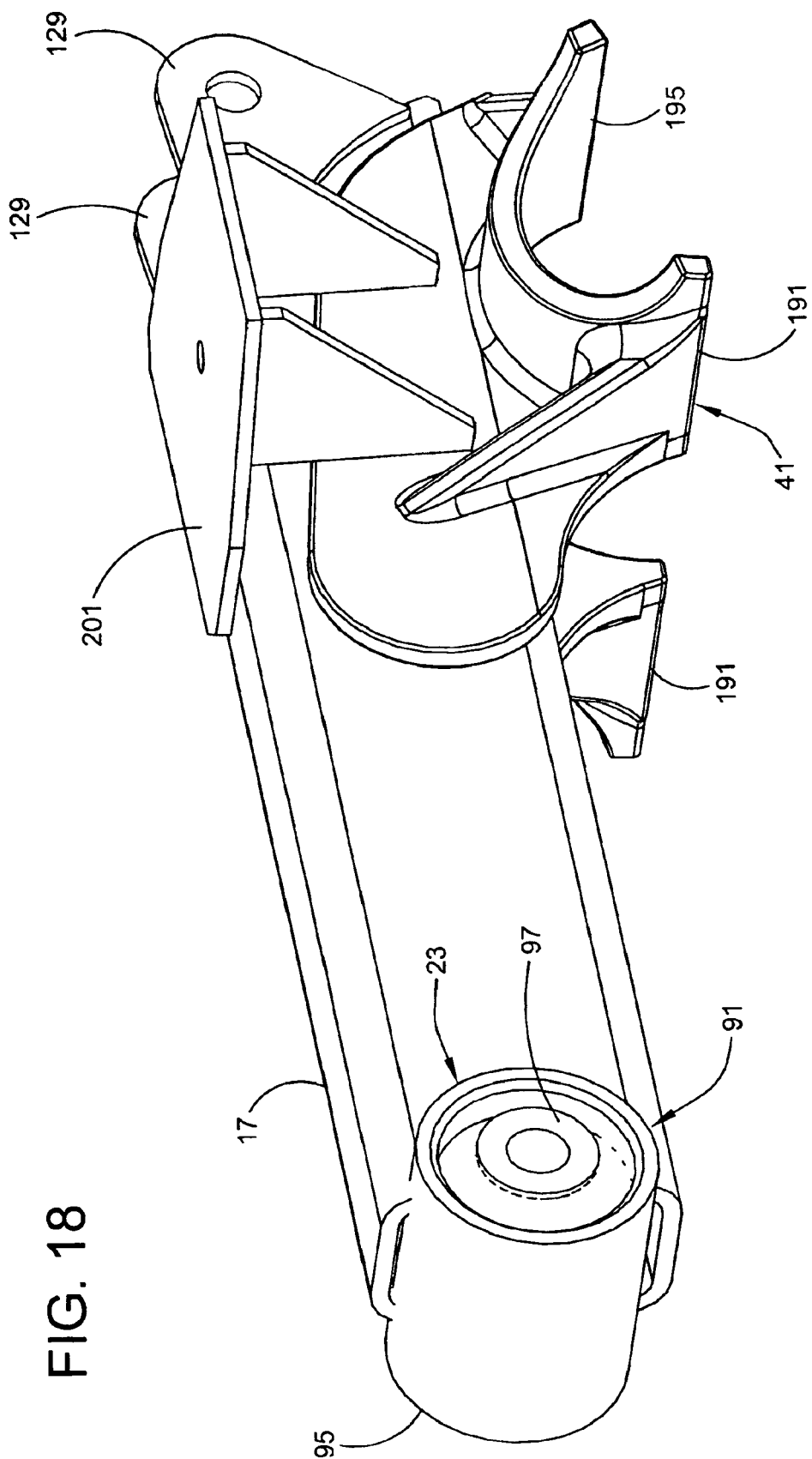
FIG. 18 is a perspective of a forward-extending beam.

As illustrated in FIGS. 18 and 19, each axle support 41 on a beam 17, 19 is adapted for supporting an axle under the beam. The support 41 comprises a pair of axle seats 191 affixed (e.g., welded) to opposite side walls of the beam adjacent a respective end of the beam (the forward end in the case of a forward-extending beam 17 and the rearward end in the case of a rearward-extending beam 19). The seats 191 have portions which project laterally away from the beam and which are formed with rounded, downwardly facing surfaces 195 against which a respective axle is seated and secured, as by welding. Axle supports having other configurations may also be used. It is preferred, however, that the axles 27, 33 be mounted on the underside of the beams 17, 19, since this enables the height of at least the intermediate hangers 9 to be reduced. (The height of the hanger 9 may be less than 10 in. from the top of the hanger down to the center lever pivot connection 15.) A shorter hanger design is advantageous since less material is required, resulting in reduced weight and cost. The shorter design also decreases the bending stresses on the frame 3. Further, the underslung axle design allows the air bags 35, 37 to be mounted at locations directly above respective axles 27, 33 so that the air bags support the entire load of the vehicle for a softer ride.

Each air bag 35, 37 comprises a generally tubular bag (FIG. 3) attached at its lower end to a platform 201 (FIGS. 18 and 19) affixed (e.g., welded) to a respective beam directly above the axle support 41 and at its upper end to the frame. The bag is closed at its upper and lower ends to define a chamber 215 filled with pressurized air in conventional fashion to cushion the ride of the vehicle.

Since torque arms are not provided at the rear of the suspension, rear shock absorbers 231 are used to limit the upward travel of the frame 3 away from the rearward-extending beams 19 (i.e, the vertical separation between the frame and the beams), so that the rear air bags 37 are not unduly stressed. Each rear shock absorber 231 has a pivot connection 233 (FIG. 2) at its upper end with a respective rail 5 of the frame and a pivot connection 235 at its lower end with a bracket 239 on a respective rearward-extending beam 19 adjacent its back end.

Figure 18A:
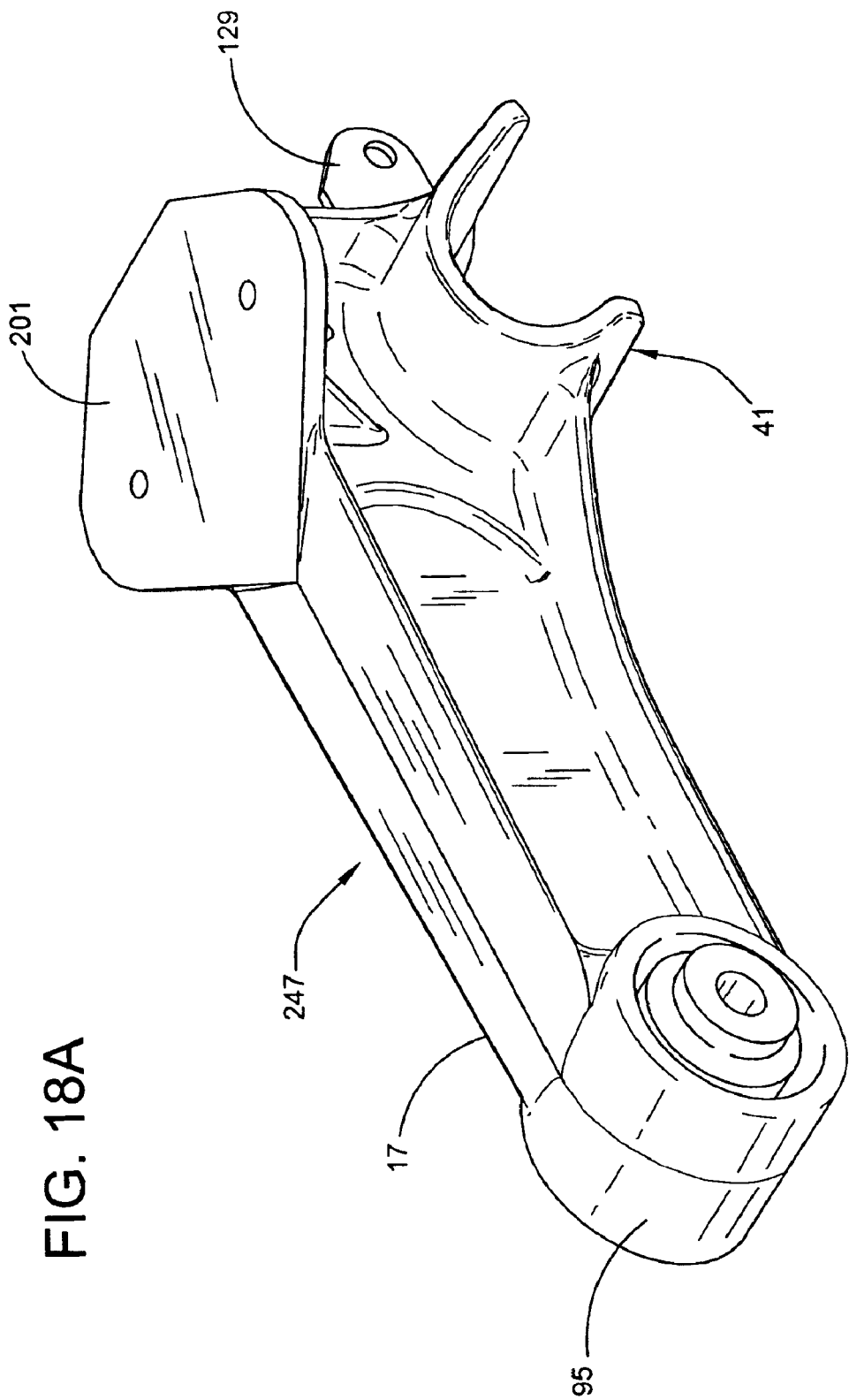
FIG. 18A is a perspective of an alternative forward-extending beam.

FIGS. 18A and 19A show an alternative embodiment of respective beams 17, 19 in which each beam is formed as a one-piece casting 247, 249 having the axle support 41, outer sleeve 95, mounting lug 129 (FIG. 18A), platform 201, and bracket 239 (FIG. 19A) formed as integral components of the casting. It will be understood that the beams 17, 19 shown in FIGS. 18A and 19A can be interchangeably used in the suspension 1 without departing from the scope of this invention.

Figure 2:
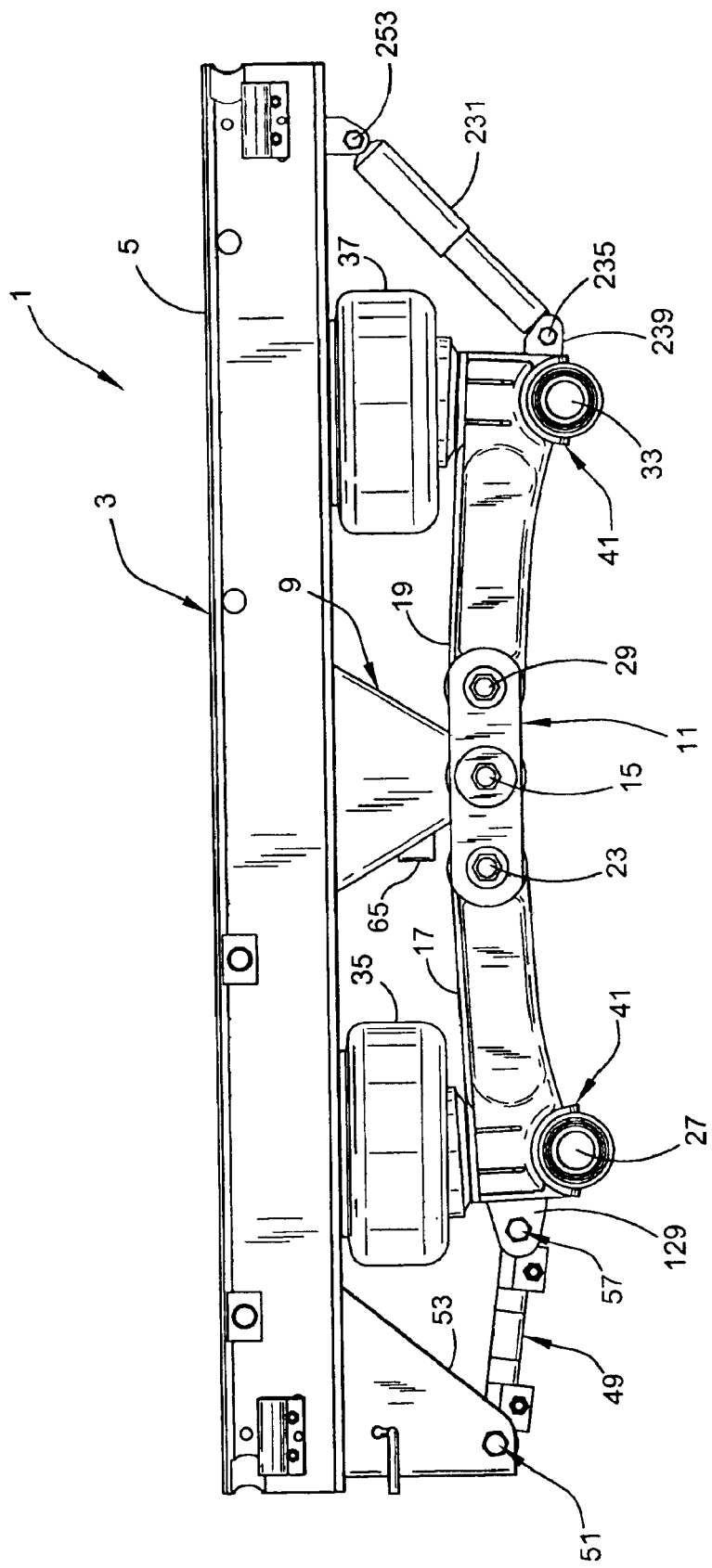
FIG. 2 is a side elevation of FIG. 1.
Figure 3:
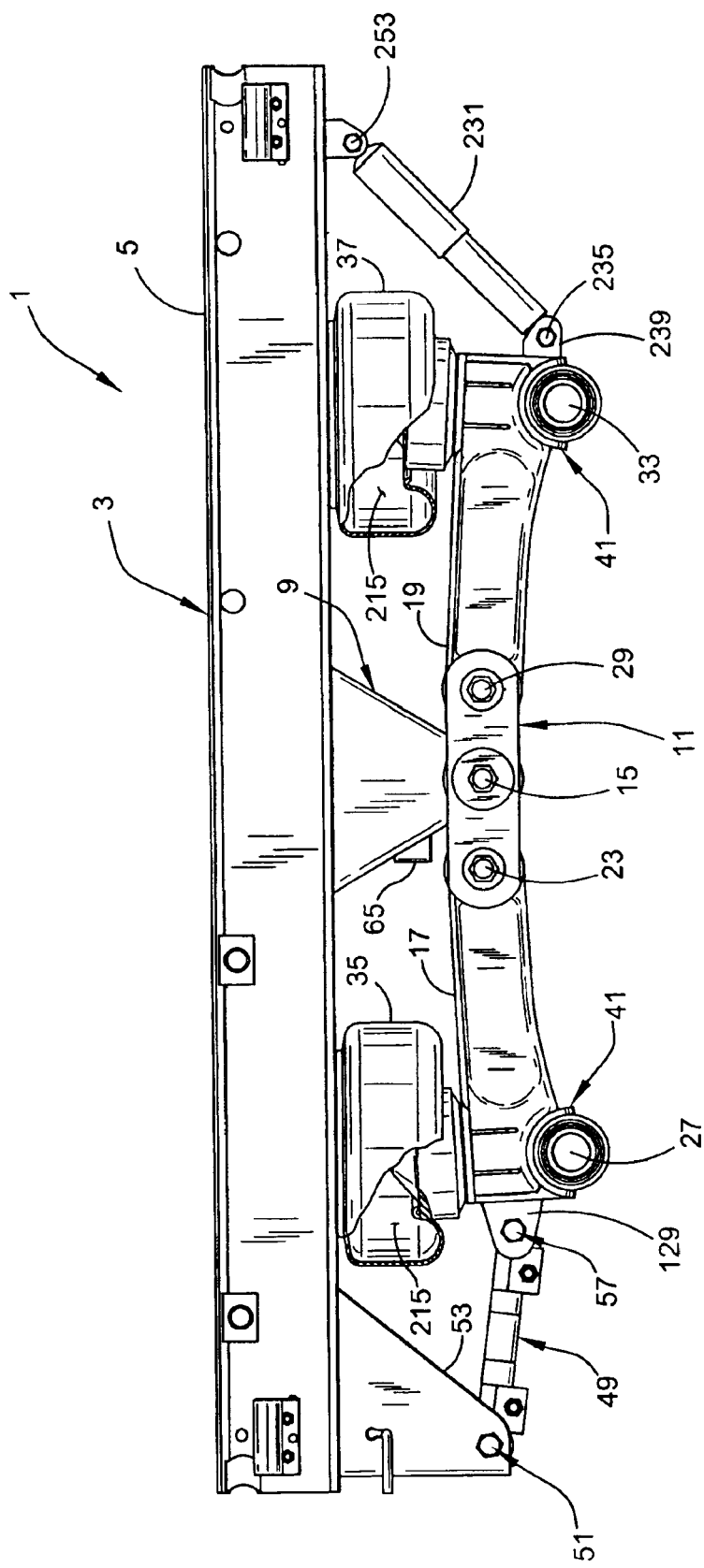
FIG. 3 is a side elevation of FIG. 1 with forward and rearward springs in partial section.
Figure 4:
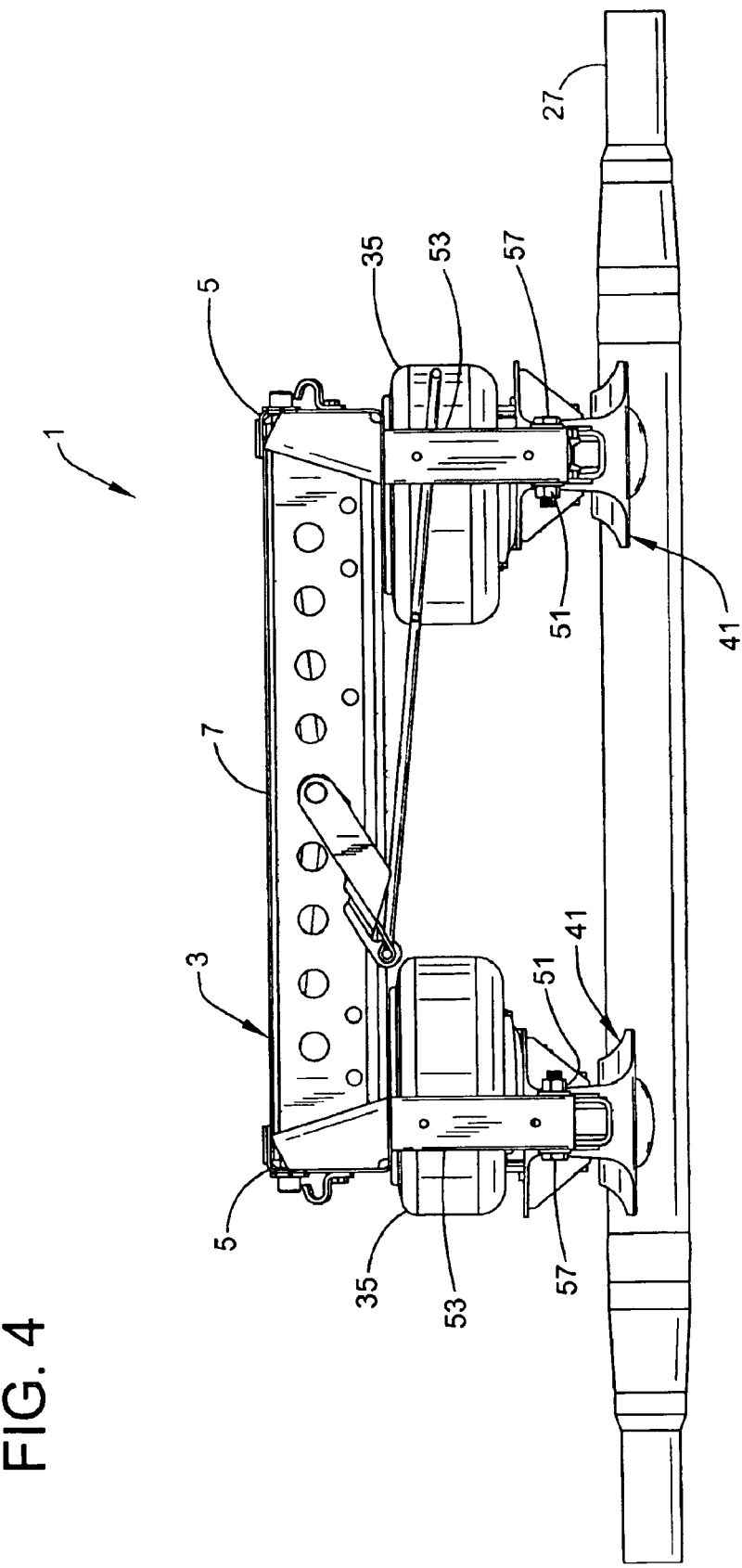
FIG. 4 is a forward end elevation of FIG. 1.
Figure 12:
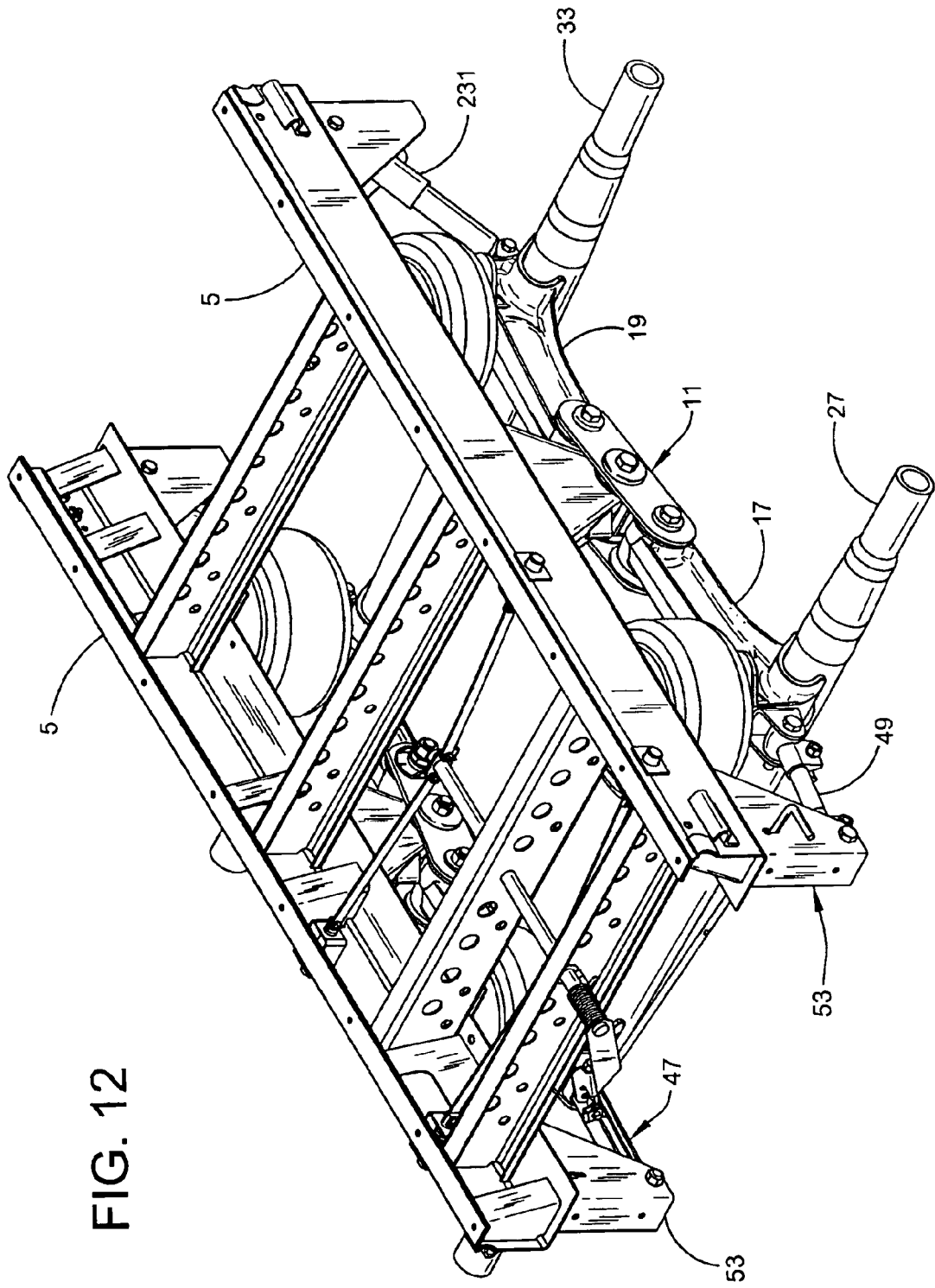
FIG. 12 is a perspective of the suspension system of FIG. 1 in a pivoted position.
Figure 13:
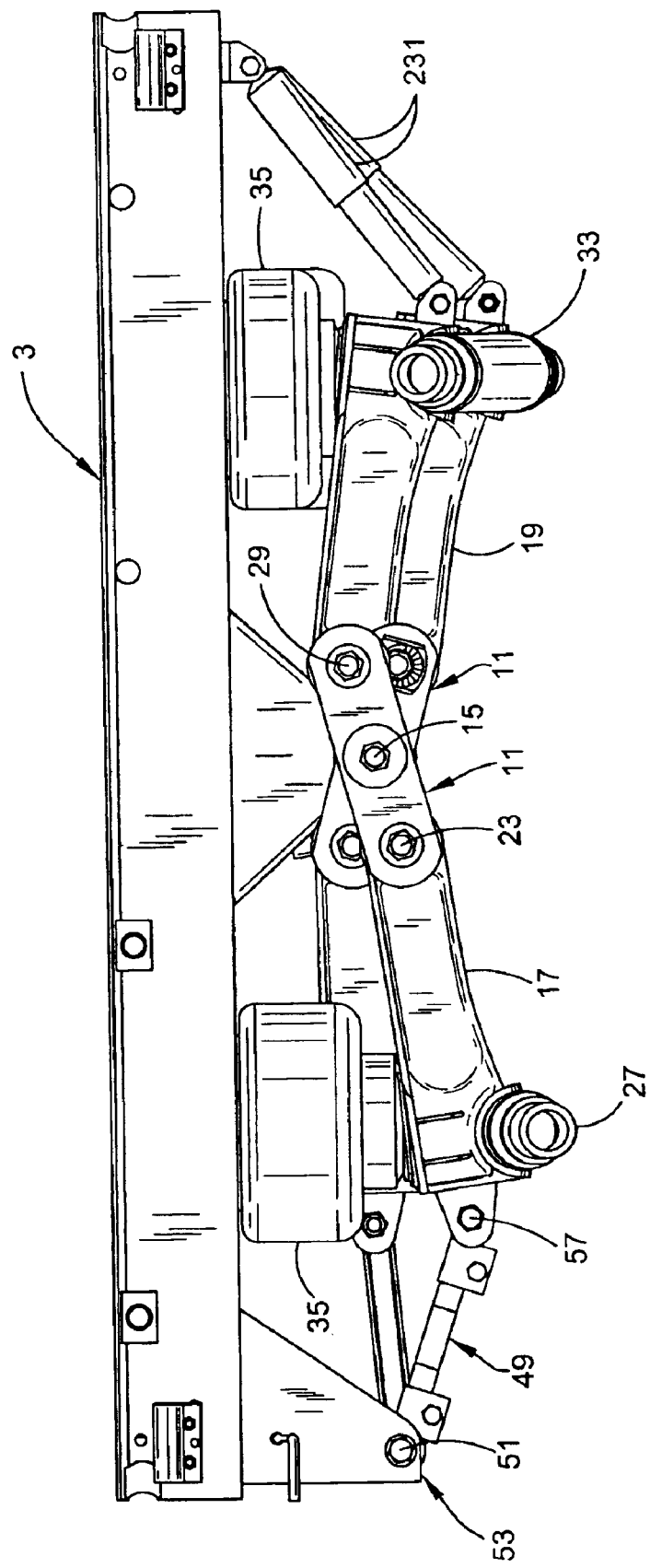
FIG. 13 is a side elevation of FIG. 12.
Figure 14:
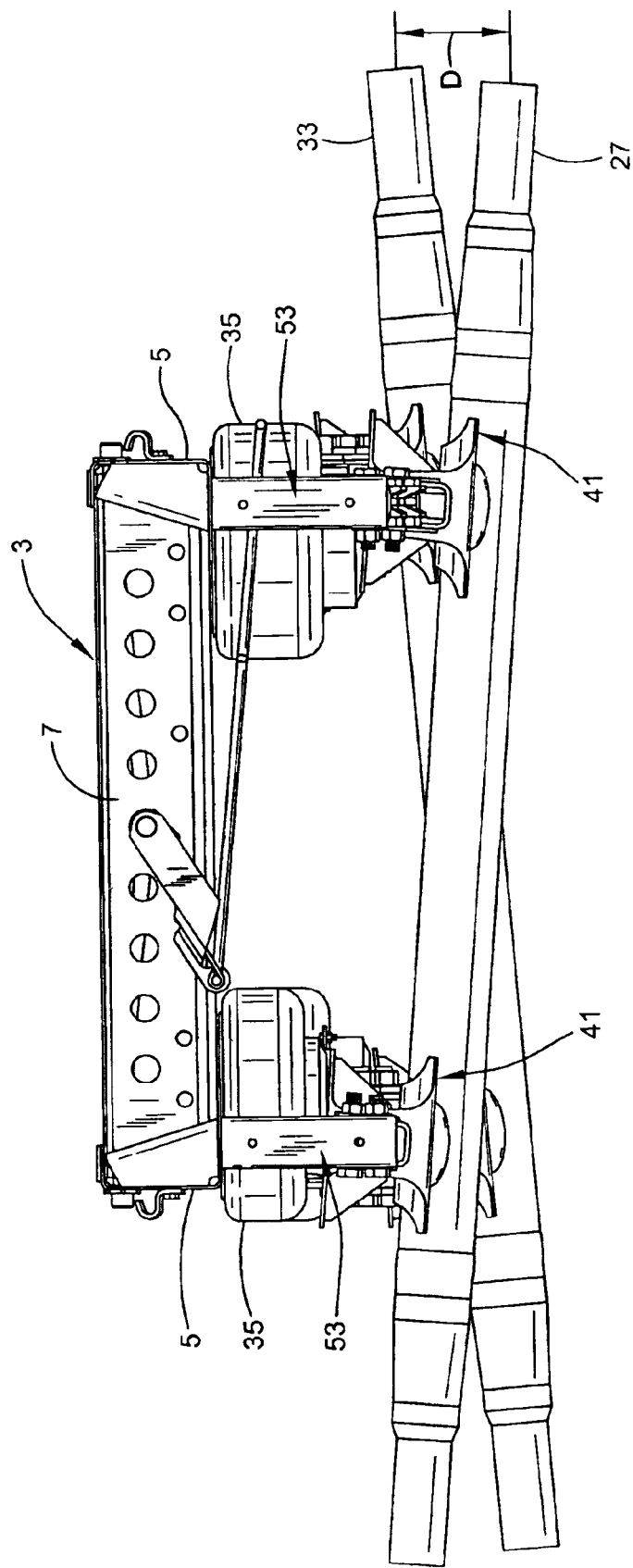
FIG. 14 is a forward end elevation of FIG. 12.

In operation, the suspension 1 is biased by the resilience of the various pivot connections 15, 23, 29, 51, 53 to a neutral position, such as the position shown in FIG. 2 in which the equalizing levers 11 and torque arms 47, 49 are generally horizontal, in which the beam connections 23 with the intermediate hangers 9 are preferably at an elevation somewhat above (e.g., 1.0 in. above) the pivot connections 57 between the beams 17 and the torque arms, and in which the forward and rearward axles 27, 33 are spaced below (e.g., 5.75 in. below) the latter pivot connections 57. In the event the wheels of the vehicle travel over diagonal bumps, the suspension 1 will act as shown in FIGS. 12–14. That is, the equalizing levers 11 and beams 17, 19 will pivot to spread the load substantially uniformly between the forward and rearward axles 27, 33, and uniformly over the length of each axle thereby reducing axle torque while providing good roll stability. The torque arms 47, 49 limit the up and down movement of the forward-extending beams 17 to further limit torsional stresses on the forward axle 27. The same is true during braking of the vehicle, during which the front axle tends to move down but is restrained by the torque arms. Additionally, stops 65 may be provided on each hanger 9 for contact with forward extending beams 17 to limit the upward movement of the beams and the corresponding pivoting action of each lever 11 about its horizontal axis 16.

It will be observed from the foregoing that the suspension beams 17, 19 are arranged in a push-pull orientation, that is, the forward beams 17 are pushed forward and the rearward beams 19 are pulled forward as the vehicle moves along the road. This arrangement eliminates the "dock walk" problem suffered by many conventional air-ride suspensions.

Figure 20:
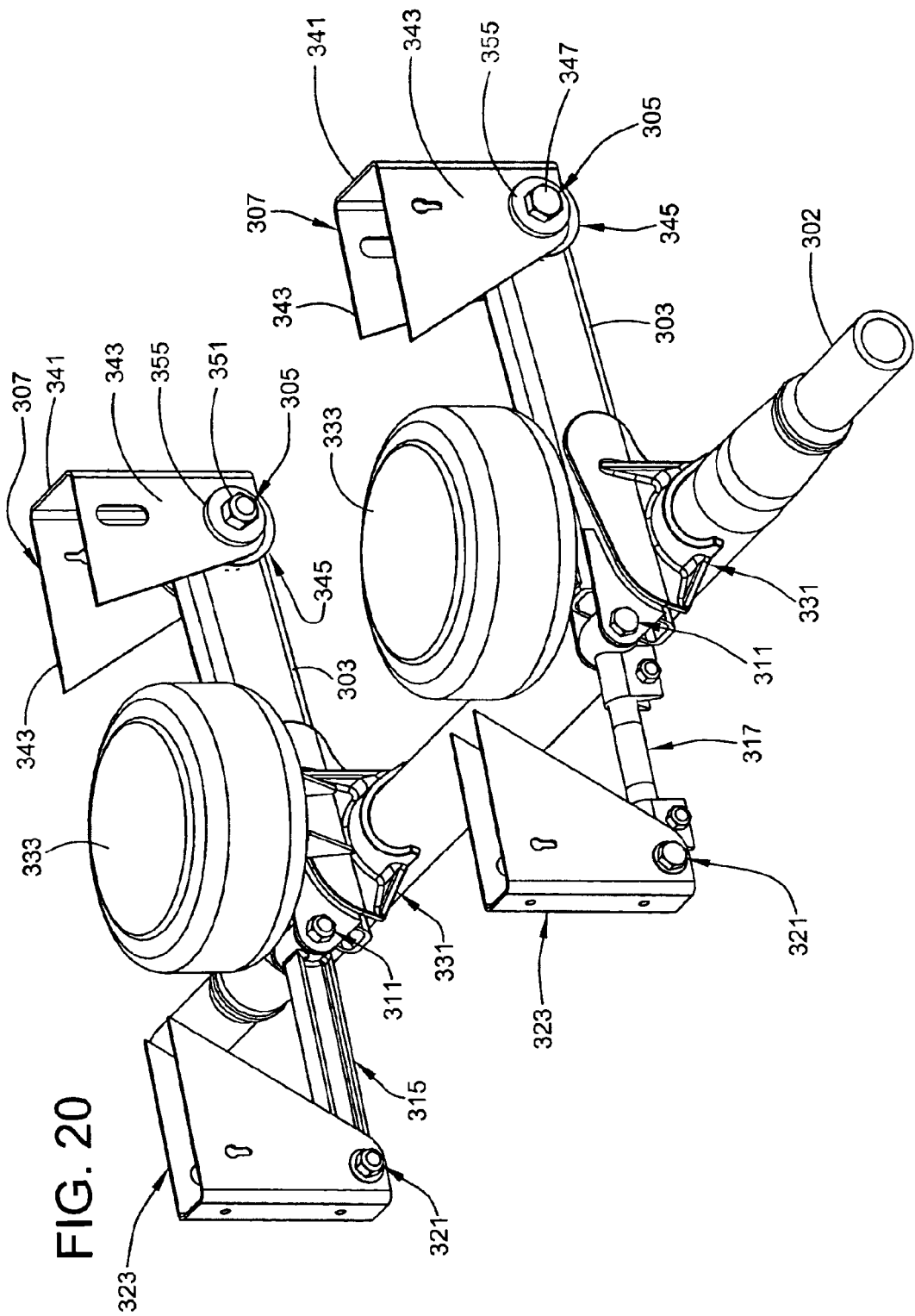
FIG. 20 is a perspective of a second embodiment of the suspension.

FIG. 20 illustrates a suspension of a different embodiment, generally designated 301, suitable for vehicles with only one axle 302, including relatively short flatbed trailers and so-called "pup trailers". The suspension 301 is similar to the suspension 1 described above except that there is only one set of rigid ("walking") suspension beams, i.e., a pair of forward-extending beams 303, and no equalizing levers. The two beams 303 have pivot connections at their rearward ends 305 with a pair of intermediate hangers 307 attached to the frame of the trailer (not shown), and they have pivot connections 311 at their forward ends to torque arms 315, 317 which are preferably of the same construction as the torque arms 47, 49 of the previous embodiment (i.e., one of fixed length and the other preferably of adjustable length) and which have pivot connections 321 to forward hangers 323 attached to the frame. Preferably, pivot connections 311 and 321 are identical to connections 57 and 51, respectively, of suspension 1 described above. The axle supports 331 and air bags 333 are also preferably of the same design as the previous embodiment.

The intermediate hangers 307 illustrated in the drawings are generally channel-shaped, each having a back wall 341 and a pair of side walls 343 extending forward from the back wall. Each of the pivot connections 305 between the beams 303 and intermediate hangers comprises a bushing assembly, generally designated 345, a pivot bolt 347 extending through the bushing assembly and through aligned holes in the side walls 343 of the respective hanger 307, and a nut 351 tightened on the bolt. Washers 355 are provided between the head of the bolt 347 and one side wall 343 of the hanger and between the nut 351 and the other side wall 343 of the hanger. The bushing assembly 345 is identical to the bushing assembly 379 of the aforementioned PCT application. When the nut 351 is tightened, the inner sleeve is held stationary and the outer sleeve, which is rigidly attached to a respective beam 303, is allowed to rotate relative to the inner sleeve to the extent permitted by the resilient bushing member, as previously described. As in the previous embodiment, the pivot connections 321 between the torque arms 315, 317 and the forward hangers 323 and the pivot connections 311 between the torque arms and the beams 303 preferably have a resistance to compression in the horizontal direction greater than that of the pivot connections 305.

Figure 21:
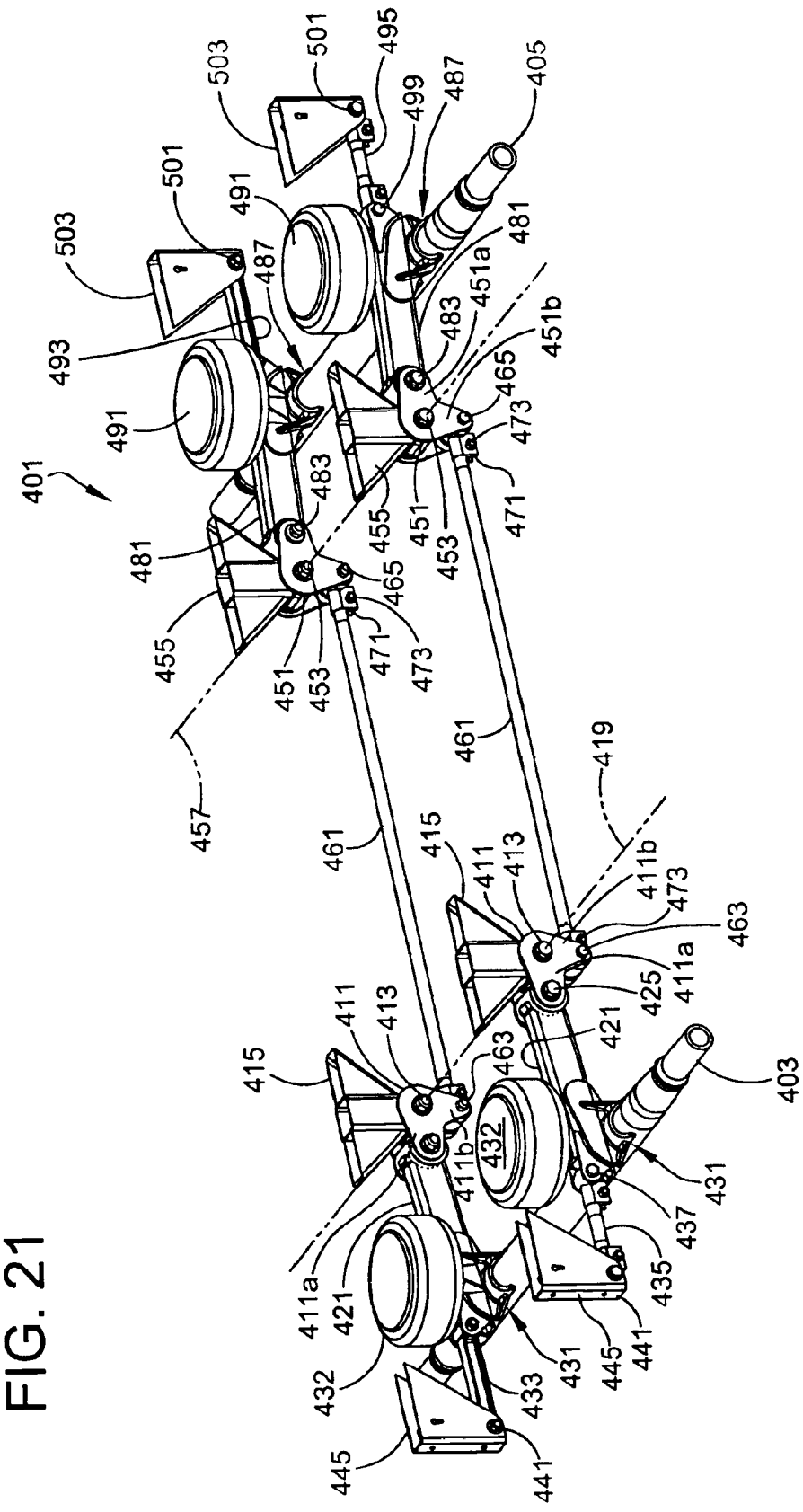
FIG. 21 is a perspective of a third embodiment of the suspension.
Figure 22:
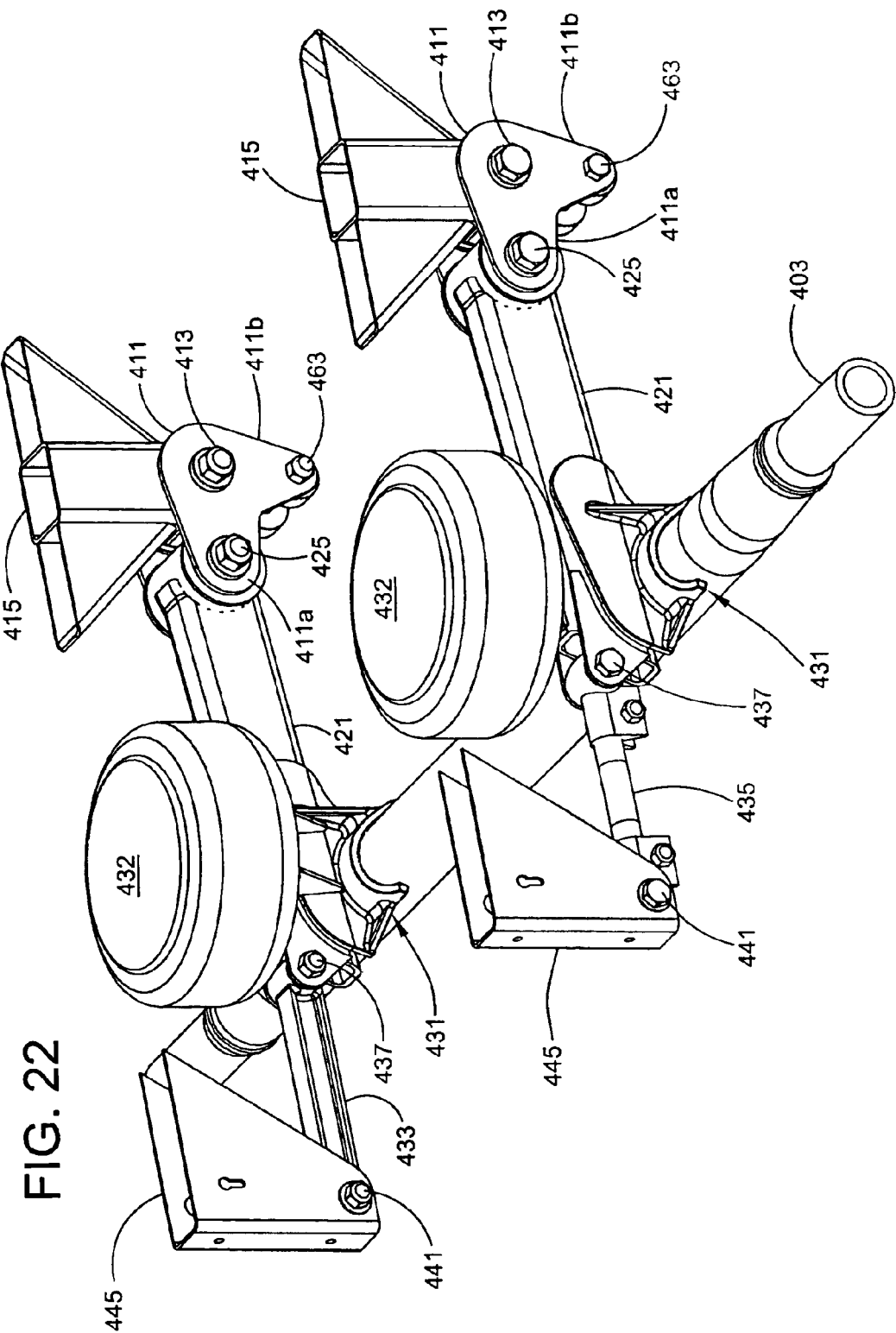
FIG. 22 is enlarged perspective of FIG. 21 showing a front axle and a pair of front equalizing levers.

The suspension 301 has several advantages over prior single-axle suspensions including the elimination of shock absorbers and the corresponding reduction in maintenance costs. FIGS. 21–22 illustrate a third embodiment of a suspension of the present invention, designated 401 in its entirety. This suspension is particularly suited for longer flatbed trailers having tandem front and rear axles 403, 405. It comprises two single-axle suspensions of the type described in the previous embodiment, arranged in opposing relation to eliminate "dock-walk", and a lever equalizing system to be described hereinafter.

Specifically, the suspension 401 comprises a pair of first (front) equalizing levers 411 having pivot connections 413 with a first pair of intermediate hangers 415 on the frame (not shown) intermediate the ends of the frame at opposite sides of the frame. Each lever 411 is pivotally mounted with respect to the frame for swinging movement on a first axis 419 intermediate opposite ends of the lever extending transverse to the frame. In one embodiment, each of the front equalizing levers 411 comprises a crank having a forward extending crank arm 411a and a downward extending crank arm 411b. A pair of rigid suspension ("walking") beams 421 extend forward from the front levers 411. Each of these beams 421 has a pivot connection 425 with the forward-extending arm 411a of a respective crank and has a support 431 for the forward axle 403 forward of the crank pivot connection 425. A pair of forward air bags 431 is provided, each interposed between a respective forward-extending beam 421 and the frame (not shown).

The suspension 401 includes a pair of forward torque arms 433, 435, each having a pivot connection 437 at its rear end with a respective forward-extending beam 421 and a pivot connection 441 at its forward end with a forward hanger 445, as described in the previous embodiments. The forward torque arms 433, 435 function to restrict pivotal movement of the beams 421 about their respective pivot connections 425 with the front equalizing levers 411 thereby to reduce torsional forces applied to the forward axle 403.

A pair of second (back) equalizing levers 451 is carried by the frame intermediate the ends of the frame at opposite sides of the frame at locations rearward of the front levers 411. The back levers 451 have pivot connections 453 with a second pair of intermediate hangers 455 on the frame intermediate the ends of the frame at opposite sides of the frame for swinging movement on a second axis 457 intermediate opposite ends of each back lever extending transverse to the frame generally parallel to axis 419. The spacing between the first axis 419 of the front equalizing levers 411 and the second axis 457 of the back equalizing levers 451 may vary, but a typical dimension is 10 feet. Similar to the front levers 411, each of the back levers 451 may comprise a crank having a rearward extending crank arm 451a and a downward extending crank arm 451b.

A pair of generally horizontal tie bars 461 at opposite sides of the frame connect the front and back equalizing levers 411, 451. Each tie bar 461 has a pivot connection 463 at its forward end with the downward extending crank arm 411b of a respective front lever 411 and a pivot connection 465 at its rearward end with the downwardly extending arm 451b of a respective back lever 451. Preferably, the tie bars are adjustable in length in the same manner as the adjustable torque bars 49, 317, 435 previously described, each tie bar having end fittings 471 with nut and bolt fasteners 473, for example, which can be loosened to allow rotation of the tie bar on its axis and adjustment of the spacing between the pivot connections 463 and 465, and tightened to prevent further rotation of the tie bar (see FIGS. 15–17).

A second pair of rigid (walking) beams 481 extends rearward from the back equalizing levers 451. These beams 481 have pivot connections 483 at their forward ends with the rearward extending crank arms 451a of respective back equalizing levers 451. These beams 481 also carry supports 487 for the rear axle 405 rearward of their pivot connections 483 with the back levers 451. A pair of rearward air bags 491 is provided, each being interposed between a respective rearward-extending beam 481 and the frame. A pair of rearward torque arms 493, 495 is also provided of the same construction as the forward torque arms 433, 435. Each such arm 493, 495 has a pivot connection 499 at its forward end with a respective rearward-extending beam 481 and a pivot connection 501 at its rearward end with a rearward hanger 503 on the frame. The two rearward torque arms 493, 495 function to restrict pivotal movement of the rearward-extending beams 481 about their respective pivot connections 483 with the back levers 451 thereby to reduce torsional forces applied to the rearward axle.

The suspension 401 of this embodiment requires no shock absorbers. Further, the equalizing lever system insures a more uniform wheel loading. The use of the torque arms also reduces torsional stresses on the axles.

Figure 23:
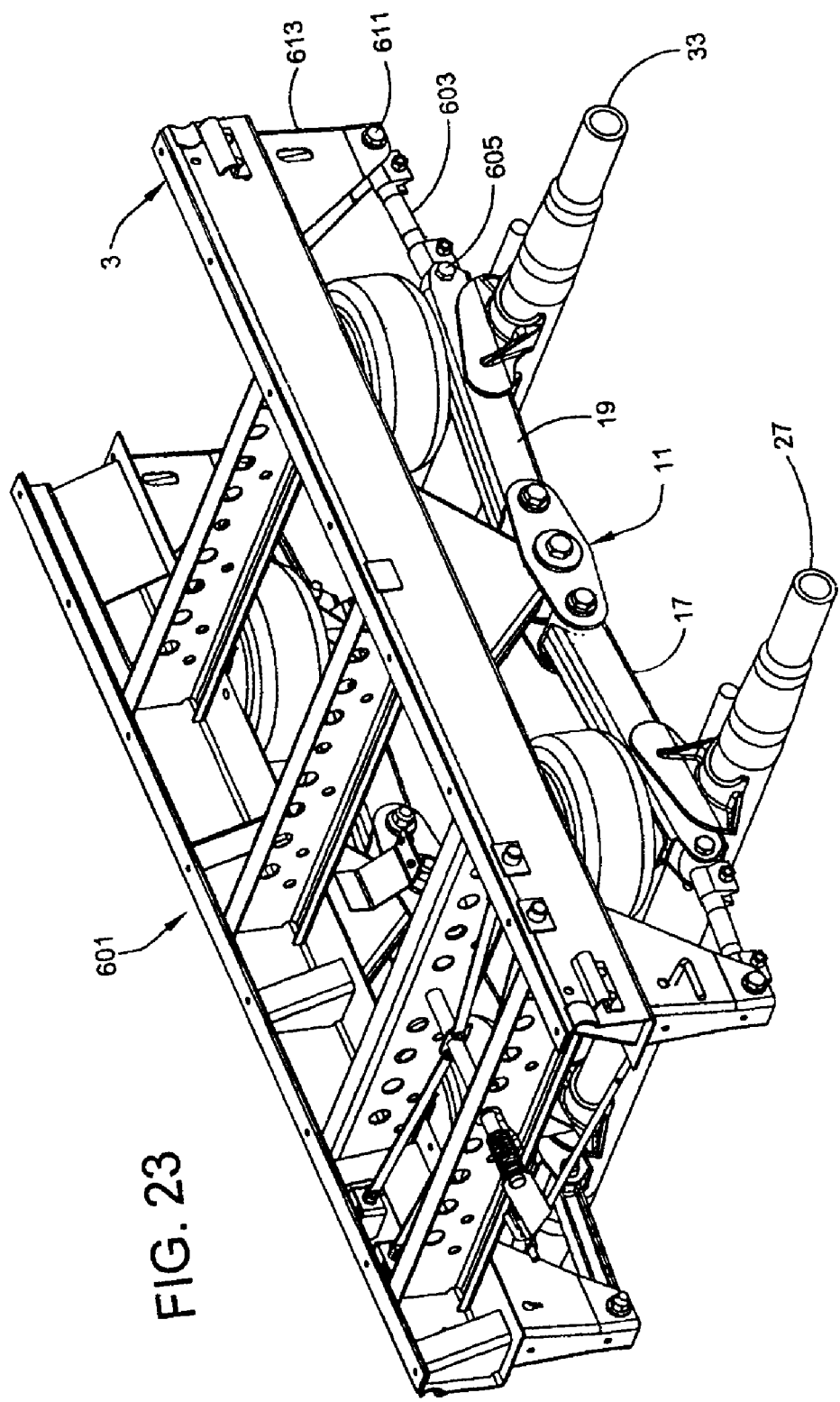
FIG. 23 is a perspective of a fourth embodiment of the suspension.

FIG. 23 illustrates another embodiment of a suspension of this invention, designated generally 601. This embodiment is essentially identical to the suspension 1 of the first embodiment, except that the rear shock absorbers are replaced by a pair of torque arms 603 (only one of which is shown) having pivot connections 605 at their forward ends to the rearward-extending beams 19 and pivot connections 611 at their rearward ends to rear hangers 613 secured to frame 3. In this embodiment, there is no need for front or rear shock absorbers.

Figure 24:
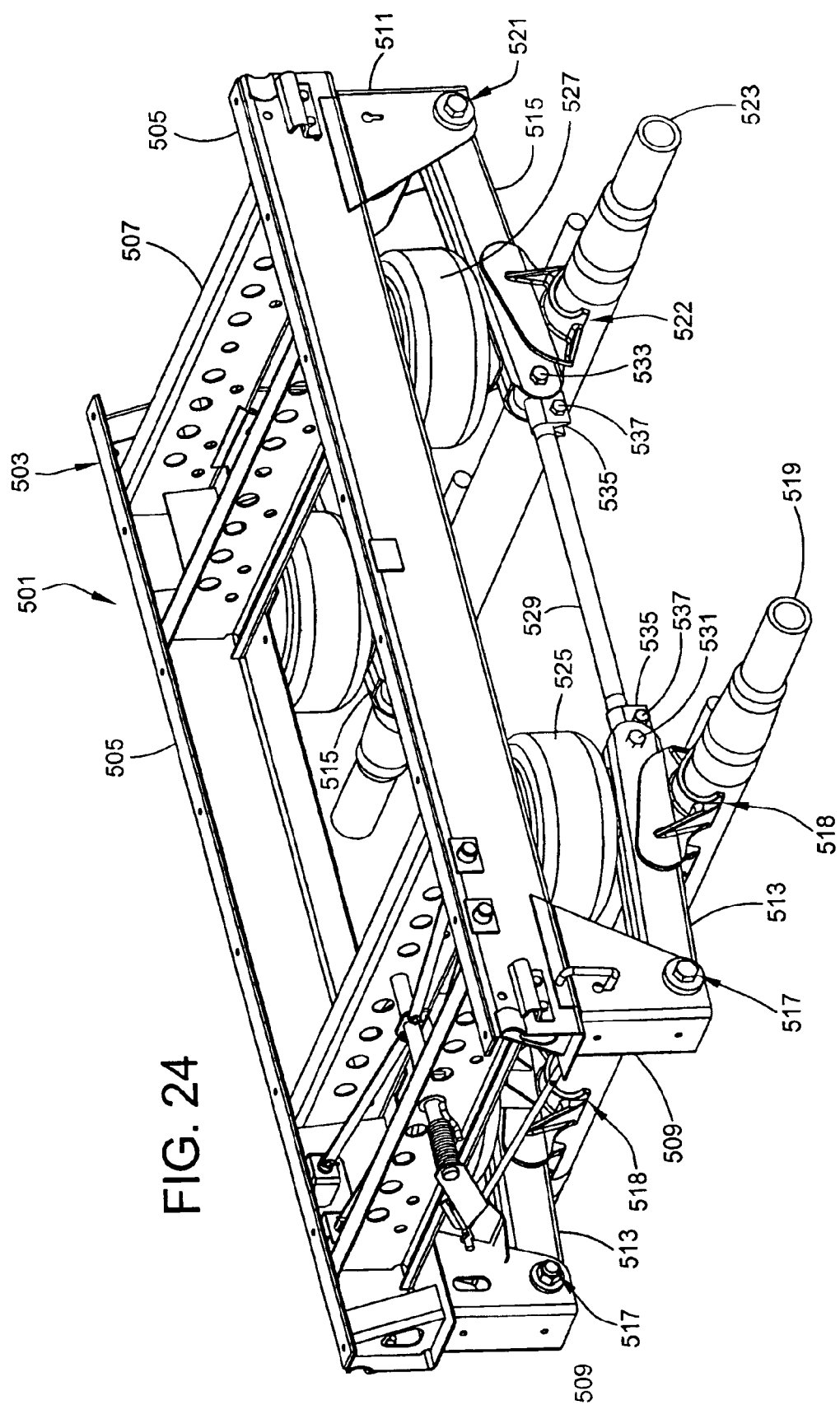
FIG. 24 is a perspective of a fifth embodiment of the suspension.

FIG. 24 illustrates another embodiment of a suspension of the present invention, designated 501 in its entirety. The suspension 501 comprises a frame 503, similar to the frame of suspension 1, having forward and rearward ends, the forward end being the left end as viewed in FIG. 24 and the rearward end being the opposite (right) end. Frame 503 includes a pair of parallel rails 505 connected by cross members 507, a pair of front hangers 509 depending from the rails 505 at opposite sides of the frame generally toward and near the forward ends of the rails, and a pair of rear hangers 511 depending from the rails 505 at opposite sides of the frame generally toward and near the rearward ends of the rails. In accordance with one aspect of the present invention, the frame further comprises a pair of rigid suspension beams 513 extending rearward from the front hangers 509, and a pair of rigid suspension beams 515 extending forward from the rear hangers 511. Each of the rearward-extending beams 513 has a pivot connection 517 with a respective front hanger 509 and carries a support 518 for a forward axle 519. Each of the forward-extending beams 515 has a pivot connection 521 with a respective rear hanger 511 and carries a support 522 for a rearward axle 523. The forward and rearward axle supports 518, 522 are preferably identical to axle supports 41 on beams 17, 19 described above and illustrated in FIGS. 18 and 19. A forward pair of springs 525 (e.g., air bags) is interposed between respective rearward-extending beams 513 and the frame 503, and a rearward pair of springs 527 is interposed between respective forward-extending beams 515 and the frame 503.

The suspension 501 includes a pair of generally horizontal torque arms 529 (only one of which is shown in FIG. 24) at opposite sides of the frame which connect the rearward-extending beams 513 and the forward-extending beams 515. Each torque arm 529 has a first pivot connection 531 at its forward end with a respective rearward-extending beam 513 and a second pivot connection 533 at its rearward end with a respective forward-extending beam 515. The torque arms 529 function to inhibit or restrain downward movement of the rearward-extending beams 513 and upward movement of the forward-extending beams 515, as during braking, thus reducing the torsional forces applied to the forward axle 519 and rearward axle 523. Preferably, one of the torque arms (e.g., the one shown in FIG. 24) is adjustable in length in the same manner as the adjustable torque arms 49, 317, 435 previously described. The adjustable torque arm can be used to align the axles 519, 523 of the vehicle so that they are precisely perpendicular to the central longitudinal axis of the vehicle. The adjustable torque arm has end fittings 535 with nut and bolt fasteners 537, for example, which can be loosened to allow rotation of the torque arm on its axis and adjustment of the spacing between the pivot connections 531 and 533, and tightened to prevent further rotation of the torque arm. In one embodiment, the adjustable torque arm 529 and fittings 535 are constructed as shown in FIGS. 15–17, except that the torque arm is longer. The other (non-adjustable) torque arm is preferably of fixed length and, except for length, is essentially identical to the torque arm 47 described above and illustrated in FIG. 1.

Pivot connections 517 and 521 are preferably compressible bushing assemblies essentially identical to pivot connections 51 described above and illustrated in FIG. 1, and pivot connections 531 and 533 are preferably compressible bushing assemblies essentially identical to pivot connections 57 described above and illustrated in FIG. 1. The resiliency of pivot connections 531 and 533 effectively bias suspension 501 to a neutral position, such as the position shown in FIG. 24, in which the pivot connections 531 and 533 of each torque arm are in generally horizontal alignment.

The suspension 501 of this embodiment uses no shock absorbers and thus reduces maintenance costs. Further, the use of the torque arms 529 reduces the torsional stresses on the forward and rearward axles during braking and helps to distribute the load more evenly over the tires during braking thus decreasing tire wear. Additionally, this embodiment has the benefit of eliminating "dock walk" and minimizing "dock squat".

When introducing elements of the present invention or the preferred embodiment(s) thereof, the articles "a", "an", "the" and "said" are intended to mean that there are one or more of the elements. The terms "comprising", "including" and "having" are intended to be inclusive and mean that there may be additional elements other than the listed elements.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. A vehicle suspension comprising:
    a vehicle frame having a forward end, a rearward end and opposite sides;
    a pair of levers carried by the frame intermediate the ends of the frame at opposite sides of the frame, each lever being pivotally mounted with respect to the frame for swinging movement on an axis intermediate opposite ends of the lever extending transverse to the frame;
    a pair of beams, one extending forward from one of the levers and the other extending forward from the other lever, each of said forward-extending beams having a pivot connection with the respective lever forward of the lever axis and having a support for a forward axle;
    a pair of beams, one extending rearward from one of the levers and the other extending rearward from the other lever, each of said rearward-extending beams having a pivot connection with the respective lever rearward of the lever axis and having a support for a rearward axle;
    a pair of forward springs each interposed between a respective forward-extending beam and the frame;
    a pair of rearward springs each interposed between a respective rearward-extending beam and the frame;
    a pair of torque arms carried by the frame forward of the forward-extending beams, each torque arm having a first pivot connection with a respective beam and a second pivot connection with said frame forward of said first pivot connection with the beam, said torque arms functioning to restrict pivotal movement of the beams about their respective pivot connections with said levers thereby to reduce torsional forces applied to the forward axle.

2. A vehicle suspension as set forth in claim 1 wherein the pivot connections between the levers and the frame are resiliently compressible to permit limited movement of the lever in fore and aft direction relative to the frame.

3. A vehicle suspension as set forth in claim 2 wherein the pivot connections between the levers and the frame have a greater resistance to compression in the vertical direction than in the fore and aft direction.

4. A vehicle suspension as set forth in claim 2 wherein the pivot connections between the levers and the frame have substantially the same resistance to compression in the vertical direction and in the fore and aft direction.

5. A vehicle suspension as set forth in claim 2 wherein the first pivot connections between the torque arms and the frame and second pivot connections between the torque arms and respective forward-extending beams have a resistance to compression greater than that of the pivot connections between the levers and the frame.

6. A vehicle suspension as set forth in claim 5 wherein the torque arms limit the vertical movement of the forward axle to a vertical range of no greater than about 6 in.

7. A vehicle suspension as set forth in claim 1 wherein said pivot connections between the frame and torque arms, between the forward-extending beams and torque arms, between the forward-extending beams and lever, and between the lever and the frame, comprise resiliently compressible bushings, and wherein said bushings bias said torque arms, forward-extending beams and levers toward a neutral position wherein the pivot connections between each torque arm and the frame and between the torque arm and a respective forward-extending beam are in generally horizontal alignment, and wherein the pivot connections between the forward-extending beam and the lever and between the lever and the frame are in generally horizontal alignment.

8. A vehicle suspension as set forth in claim 1 wherein said forward axle supports are configured for supporting the forward axle below said forward-extending beams.

9. A vehicle suspension as set forth in claim 8 wherein the two springs of said pair of forward springs are positioned on respective beams at locations corresponding to said forward axle supports.

10. A vehicle suspension as set forth in claim 1 wherein the pivot connections between said levers and the frame are spaced above the forward axle supported by the forward-extending beams.

11. A vehicle suspension as set forth in claim 1 further comprising stops for limiting said swinging movement of the levers.

12. A vehicle suspension as set forth in claim 1 wherein said forward-extending beams and said forward axle supports comprise an integral casting.

13. A vehicle suspension system as set forth in claim 1 wherein said rearward-extending beam and said rearward axle supports comprise an integral casting.

14. A vehicle suspension as set forth in claim 1 wherein at least one of said torque arms is adjustable in length to permit alignment of the forward axle relative to a longitudinal centerline of the vehicle.

15. A vehicle suspension system as set forth in claim 1 further comprising a pair of rearward torque arms carried by the frame rearward of the rearward-extending beams, each rearward torque arm having a first pivot connection with a respective rearward beam and a second pivot connection with said frame rearward of said first pivot connection with the beam, said rearward torque arms functioning to restrict pivotal movement of the rearward beams about their respective pivot connections with said levers thereby to reduce torsional forces applied to the rearward axle.

16. A vehicle suspension as set forth in claim 15 wherein at least one of said rearward torque arms is adjustable in length to permit alignment of the rearward axle relative to a longitudinal centerline of the vehicle.

17. A vehicle suspension comprising:
a vehicle frame having a forward end, a rearward end and sides; and
a pair of intermediate hangers carried by the frame intermediate the ends of the frame at opposite sides of the frame;
a pair of beams, one extending forward from one of the intermediate hangers and the other extending forward from the other intermediate hanger, each of said forward-extending beams having a pivot connection with the respective intermediate hanger and having a support for a forward axle forward of said pivot connection;
a pair of air springs each interposed between a respective forward-extending beam and the frame;
a pair of torque arms, each having a pivot connection with a respective forward-extending beam and a pivot connection with the frame forward of said pivot connection with the beam, said torque arms functioning to restrict pivotal movement of the beams about their respective pivot connections with said intermediate hangers thereby to reduce torsional forces applied to the forward axle; and
wherein the pivot connections between the intermediate hangers and the forward-extending beams are resiliently compressible to permit limited movement of the beams in fore and aft direction relative to the frame.

18. A vehicle suspension as set forth in claim 17 wherein the pivot connections between the intermediate hangers and the forward-extending beams have substantially the same resistance to compression in the vertical and fore-and-aft directions.

19. A vehicle suspension as set forth in claim 17 wherein the pivot connections between the torque arms and the frame and the pivot connections between the torque arms and respective forward-extending beams have a resistance to compression greater than that of the pivot connections between the forward-extending beams and the intermediate hangers.

20. A vehicle suspension comprising:
a vehicle frame having a forward end, a rearward end and sides; and
a pair of intermediate hangers carried by the frame intermediate the ends of the frame at opposite sides of the frame;
a pair of beams, one extending forward from one of the intermediate hangers and the other extending forward from the other intermediate hanger, each of said forward-extending beams having a pivot connection with the respective intermediate hanger and having a support for a forward axle forward of said pivot connection;
a pair of air springs each interposed between a respective forward-extending beam and the frame;
a pair of torque arms, each having a pivot connection with a respective forward-extending beam and a pivot connection with the frame forward of said pivot connection with the beam, said torque arms functioning to restrict pivotal movement of the beams about their respective pivot connections with said intermediate hangers thereby to reduce torsional forces applied to the forward axle; and
wherein at least one of said torque arms is adjustable in length to permit alignment of the forward axle relative to a longitudinal centerline of the vehicle.

21. A vehicle suspension comprising:
a vehicle frame having a forward end, a rearward end and sides;
a pair of first levers carried by the frame intermediate the ends of the frame at opposite sides of the frame, each lever being pivotally mounted with respect to the frame for swinging movement on an axis intermediate opposite ends of the lever extending transverse to the frame;
a pair of beams, one extending forward from one of the first levers and the other extending forward from the other first levers, each of said forward-extending beams having a pivot connection with a respective first lever and having a support for a forward axle forward of said pivot connection;
a pair of forward springs each interposed between a respective forward-extending beam and the frame;

a pair of forward torque arms, each having a pivot connection with a respective forward-extending beam and a pivot connection with the frame forward of said pivot connection with the beam, said forward torque arms functioning to restrict pivotal movement of the beams about their respective pivot connections with said first levers thereby to reduce torsional forces applied to the forward axle;

a pair of second levers carried by the frame intermediate the ends of the frame at opposite sides of the frame at locations rearward of said first levers, each second lever being pivotally mounted with respect to the frame for swinging movement on an axis intermediate opposite ends of the second lever extending transverse to the frame;

a pair of tie bars at opposite side of the frame for connecting the first and second levers, each tie bar having a pivot connection with one of the first levers and a pivot connection with one of the second levers, a pair of beams, one extending rearward from one of the second levers and the other extending rearward from the other second lever, each of said rearward-extending beams having a pivot connection with the respective second lever and having a support for a rear axle rearward of said pivot connection;

a pair of rearward springs each interposed between a respective rearward-extending beam and the frame;

a pair of rearward torque arms, each having a pivot connection with a respective rearward-extending beam and a pivot connection with the frame rearward of said pivot connection with the beam, said rearward torque arms functioning to restrict pivotal movement of the rearward-extending beams about their respective pivot connections with said second levers thereby to reduce torsional forces applied to the rearward axle.

22. A vehicle suspension as set forth in claim 21 wherein each of said first and second levers comprises a crank pivoted on the frame.

23. A vehicle suspension as set forth in claim 21 wherein at least one of said forward torque arms is adjustable in length to permit alignment of the forward axle relative to a longitudinal centerline of the vehicle, and at least one of said rearward torque arms is adjustable in length to permit alignment of the rear axle relative to said longitudinal centerline of the vehicle.

24. A vehicle suspension comprising:

a vehicle frame having a forward end, a rearward end and opposite sides;

said frame including a pair of front hangers toward the front of the frame at opposite sides of the frame and a pair of rear hangers toward the back of the frame at opposite sides of the frame;

a pair of beams, one extending rearward from one of said front hangers and the other extending rearward from the other of the front hangers, each rearward-extending beam having a pivot connection with a respective front hanger and having a support for a forward axle;

a pair of beams, one extending forward from one of said rear hangers and the other extending forward from the other of the rear hangers, each forward-extending beam having a pivot connection with a respective rear hanger and having a support for a rearward axle;

a pair of forward springs each interposed between a respective rearward-extending beam and the frame;

a pair of rearward springs each interposed between a respective forward-extending beam and the frame;

a pair of torque arms at opposite sides of the frame, each torque arm extending rearward from a rearward-extending beam to a forward extending beam at a respective side of the frame and having a first pivot connection with the rearward extending beam and a second pivot connection with the forward extending beam, said torque arms functioning to restrict pivotal movement of the beams about their respective pivot connections with said hangers thereby to reduce torsional forces applied to the forward and rearward axles.

25. A vehicle suspension as set forth in claim 24 wherein said pivot connections between the front hangers and the rearward-extending beams and between the rear hangers and the forward-extending beams comprise resiliently compressible bushings.

26. A vehicle suspension as set forth in claim 24 wherein said pivot connections between the rearward-extending beams and torque arms, and between the forward-extending beams and torque arms comprise resiliently compressible bushings, and wherein said bushings bias said torque arms, rearward-extending beams, and forward-extending beams toward a neutral position wherein the pivot connections between each torque arm and respective rearward-extending and forward-extending beams are in generally horizontal alignment.

27. A vehicle suspension as set forth in claim 24 wherein said forward axle supports are configured for supporting the forward axle below said rearward-extending beams and said rearward axle supports are configured for supporting the rearward axle below said forward-extending beams.

28. A vehicle suspension as set forth in claim 24 wherein at least one of said torque arms is adjustable in length to permit alignment of said axles relative to a longitudinal centerline of the vehicle.

* * * * *